(12) United States Patent
Jiang et al.

(10) Patent No.: US 11,818,336 B2
(45) Date of Patent: *Nov. 14, 2023

(54) SYSTEMS AND METHODS FOR INTRA PREDICTION

(71) Applicant: ZHEJIANG DAHUA TECHNOLOGY CO., LTD., Zhejiang (CN)

(72) Inventors: Dong Jiang, Hangzhou (CN); Jucai Lin, Hangzhou (CN); Jun Yin, Hangzhou (CN); Feiyang Zeng, Hangzhou (CN); Cheng Fang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/343,840

(22) Filed: Jun. 10, 2021

(65) Prior Publication Data

US 2021/0297663 A1 Sep. 23, 2021

Related U.S. Application Data

(63) Continuation of application No. PCT/CN2019/126589, filed on Dec. 19, 2019.

(30) Foreign Application Priority Data

Dec. 29, 2018 (CN) .......................... 201811642990.3

(51) Int. Cl.
*H04N 19/105* (2014.01)
*H04N 19/146* (2014.01)
(Continued)

(52) U.S. Cl.
CPC ......... *H04N 19/105* (2014.11); *H04N 19/146* (2014.11); *H04N 19/182* (2014.11); *H04N 19/80* (2014.11)

(58) Field of Classification Search
CPC .. H04N 19/105; H04N 19/146; H04N 19/182; H04N 19/80; H04N 19/117; H04N 19/159; H04N 19/593
(Continued)

(56) References Cited

U.S. PATENT DOCUMENTS

2011/0243225 A1 10/2011 Min et al.
2015/0350640 A1 12/2015 Jeong et al.
(Continued)

FOREIGN PATENT DOCUMENTS

CN 103200401 A 7/2013
WO 2017205701 A1 11/2017
WO 2018132380 A1 7/2018

OTHER PUBLICATIONS

Jung Won Kang et al., Description of SDR Video Coding Technology Proposal by ETRI and Sejong University, Joint Video Experts Team (JVET) of ITU-T SG 16 WP 3 and ISO/IEC JTC 1/SC 29/WG 11, 2018, 41 pages.
(Continued)

*Primary Examiner* — Ayman A Abaza
(74) *Attorney, Agent, or Firm* — METIS IP LLC

(57) ABSTRACT

An intra prediction system is provided. The system may determine a coding unit in an image, the coding unit including a plurality of pixels. The system may determine at least one first reference line and at least one second reference line associated with the coding unit. For each of the plurality of pixels in the coding unit, the system may determine a target predicted value of the pixel based on the at least one first reference line and the at least one second reference line according to a prediction mode. The system may determine a predicted coding unit corresponding to the coding unit based on a plurality of target predicted values of the plurality of pixels in the coding unit.

18 Claims, 16 Drawing Sheets

(51) Int. Cl.
*H04N 19/182* (2014.01)
*H04N 19/80* (2014.01)

(58) Field of Classification Search
USPC .................................................. 375/240.02
See application file for complete search history.

(56) References Cited

U.S. PATENT DOCUMENTS

| | | | |
|---|---|---|---|
| 2017/0347102 A1* | 11/2017 | Panusopone | H04N 19/105 |
| 2017/0347103 A1 | 11/2017 | Yu et al. | |
| 2018/0288425 A1 | 10/2018 | Panusopone et al. | |
| 2018/0332284 A1 | 11/2018 | Liu et al. | |
| 2019/0238835 A1* | 8/2019 | Lee | H04N 19/176 |
| 2019/0327481 A1 | 10/2019 | Zhu | |
| 2020/0077093 A1* | 3/2020 | Jang | H04N 19/105 |
| 2020/0145648 A1* | 5/2020 | Lee | H04N 19/176 |
| 2020/0359016 A1 | 11/2020 | Li et al. | |
| 2021/0211717 A1* | 7/2021 | Lee | H04N 19/11 |

OTHER PUBLICATIONS

Geert Van Der Auwera et al., Description of Core Experiment 3: Intra Prediction and Mode Coding, Joint Video Experts Team (JVET) of ITU-T SG 16 WP 3 and ISO/IEC JTC 1/SC 29/WG 11, 2018, 49 pages.

Taichiro Shiodera et al., Bidirectional Intra Prediction, Video Coding Experts Group (VCEG) of ITU-T SG. 16, 2007, 6 pages.
Geert Van Der Auwera et al., CE3: Simplified PDPC (Test 2.4.1), Joint Video Experts Team (JVET) of ITU-T SG 16 WP 3 and ISO/IEC JTC 1/SC 29/WG 11, 2018, 6 pages.
Jani Lainema et al., Intra-Picture Prediction in HEVC, High Efficiency Video Coding (HEVC): Algorithms and Architectures, 91-112, 2014.
Jiang, Dong et al., CE3-related: Intra Angular Prediction and Modified PDPC Based on Two Reference Lines, Joint Video Experts Team (JVET) of ITU-T SG 16 WP 3 and ISO/IEC JTC 1/SC 29/WG 11, 2019, 5 pages.
The Extended European Search Report in European Application No. 19906276.1 dated Mar. 29, 2022, 12 pages.
International Search Report in PCT/CN2019/126589 dated Mar. 18, 2020, 4 pages.
Written Opinion in PCT/CN2019/126589 dated Mar. 18, 2020, 5 pages.
ITU-T, Advanced Video Coding for Generic Audiovisual Services, Recommendation ITU-T H.264, 2013, 731 pages.
ITU-T, High Efficiency Video Coding, Recommendation ITU-T H.264, 2015, 635 pages.
First Office Action in Chinese Application No. 201811642990.3 dated Jun. 24, 2022, 18 pages.
Po-Han Lin et al., Multiple reference line intra prediction based on JEM7.0, Joint Video Exploration Team (JVET) of ITU-TSG 16 WP 3 and ISO/IEC JTC 1/SC 29/WG 11, 2018, 3 pages.

* cited by examiner

SYSTEMS AND METHODS FOR INTRA PREDICTION

CROSS-REFERENCE TO RELATED APPLICATIONS

This application is a continuation of International Application No. PCT/CN2019/126589, filed on Dec. 19, 2019, which claims priority to Chinese Patent Application No. 201811642990.3 filed on Dec. 29, 2018, the contents of which are incorporated herein by reference in their entirety.

TECHNICAL FIELD

The present disclosure generally relates to image processing technology, and in particular, to systems and methods for image coding.

BACKGROUND

With the development of communication and multimedia technologies, the exploration of image coding has developed rapidly nowadays. Commonly, before transmitting or storing an image, an image coding system can reduce a data redundant (e.g., a spatial redundancy, a temporal redundancy) of the image by coding the image. However, in some situations, the image coding system codes the image by defining a reference line in a left side and an upper side of a coding unit in the image, respectively, which limits the effect of reducing the data redundant of the image. Therefore, it is desirable to provide systems and methods for image coding with improved efficiency and accuracy.

SUMMARY

An aspect of the present disclosure relates to a system for image coding. The system may include at least one storage medium including a set of instructions and at least one processor in communication with the at least one storage medium. When executing the set of instructions, the at least one processor may be directed to cause the system to determine a coding unit in an image, the coding unit including a plurality of pixels; determine a plurality of first reference lines associated with the coding unit, the plurality of first reference lines being along a first side of the coding unit and each of the plurality of first reference lines including a plurality of first reference pixels; determine a plurality of second reference lines associated with the coding unit, the plurality of second reference lines being along a second side of the coding unit and each of the plurality of second reference lines including a plurality of second reference pixels; determine, for each of the plurality of pixels in the coding unit, a target predicted value of the pixel based on at least one of the plurality of first reference lines or the plurality of second reference lines according to a prediction mode; and determine a predicted coding unit corresponding to the coding unit based on a plurality of target predicted values of the plurality of pixels in the coding unit.

In some embodiments, to determine, for each of the plurality of pixels in the coding unit, the target predicted value of the pixel based on at least one of the plurality of first reference lines or the plurality of second reference lines, the at least one processor may be directed to cause the system further to determine whether the prediction mode satisfies a prediction condition. In response to determining that the prediction mode satisfies the prediction condition, the at least one processor may be directed to cause the system further to determine a first intermediate predicted value of the pixel based on at least one of the plurality of first reference lines; determine a second intermediate predicted value of the pixel based on at least one of the plurality of second reference lines; and determine the target predicted value of the pixel based on the first intermediate predicted value and the second intermediate predicted value.

In some embodiments, the predetermined prediction condition may include that an angle of the prediction mode is within a predetermined range.

In some embodiments, to determine the first intermediate predicted value of the pixel based on at least one of the plurality of first reference lines, the at least one processor may be directed to cause the system further to determine, for each of the at least one of the plurality of first reference lines, a first initial predicted value corresponding to the pixel based on at least one of the plurality of first reference pixels on the first reference line; and determine the first intermediate predicted value of the pixel based on at least one first initial predicted value corresponding to the at least one of the plurality of first reference lines.

In some embodiments, to determine, for each of the at least one of the plurality of first reference lines, the first initial predicted value corresponding to the pixel based on at least one of the plurality of first reference pixels on the first reference line, the at least one processor may be directed to cause the system further to determine a first projected pixel corresponding to the pixel on the first reference line based on the prediction mode and determine a value of the first projected pixel as the first initial predicted value corresponding to the pixel.

In some embodiments, to determine, for each of the at least one of the plurality of first reference lines, the first initial predicted value corresponding to the pixel based on at least one of the plurality of first reference pixels on the first reference line, the at least one processor may be directed to cause the system further to determine two first reference pixels corresponding to the pixel on the first reference line based on the prediction mode and determine the first initial predicted value corresponding to the pixel by performing an interpolation on the two first reference pixels.

In some embodiments, to determine the first intermediate predicted value of the pixel based on at least one first initial predicted value corresponding to the at least one of the plurality of first reference lines, the at least one processor may be directed to cause the system further to determine, for each of the at least one first initial predicted value, a weighting coefficient corresponding to the first initial predicted value based on a distance between the pixel and a first reference line corresponding to the first initial predicted value according to the prediction mode; and determine the first intermediate predicted value of the pixel by weighting the at least one first initial predicted value based on at least one weighting coefficient corresponding to the at least one first initial predicted value.

In some embodiments, to determine the second intermediate predicted value of the pixel based on at least one of the plurality of second reference lines, the at least one processor may be directed to cause the system further to determine, for each of the at least one of the plurality of second reference lines, a second initial predicted value corresponding to the pixel based on at least one of the plurality of second reference pixels on the second reference line; and determine the second intermediate predicted value of the pixel based on at least one second initial predicted value corresponding to the at least one of the plurality of second reference lines.

In some embodiments, to determine, for each of the at least one of the plurality of second reference lines, the second initial predicted value corresponding to the pixel based on at least one of the plurality of second reference pixels on the second reference line, the at least one processor may be directed to cause the system further to determine a second projected pixel corresponding to the pixel on the second reference line based on the prediction mode and determine a value of the second projected pixel as the second initial predicted value corresponding to the pixel.

In some embodiments, to determine, for each of the at least one of the plurality of second reference lines, the second initial predicted value corresponding to the pixel based on at least one of the plurality of second reference pixels on the second reference line, the at least one processor may be directed to cause the system further to determine two second reference pixels corresponding to the pixel on the second reference line based on the prediction mode and determine the second initial predicted value corresponding to the pixel by performing an interpolation on the two second reference pixels.

In some embodiments, to determine the second intermediate predicted value of the pixel based on at least one second initial predicted value corresponding to the at least one of the plurality of second reference lines, the at least one processor may be directed to cause the system further to determine, for each of the at least one second initial predicted value, a weighting coefficient corresponding to the second initial predicted value based on a distance between the pixel and a second reference line corresponding to the second initial predicted value according to the prediction mode; and determine the second intermediate predicted value of the pixel by weighting the at least one second initial predicted value based on at least one weighting coefficient corresponding to the at least one second initial predicted value.

In some embodiments, to determine the target predicted value of the pixel based on the first intermediate predicted value and the second intermediate predicted value, the at least one processor may be directed to cause the system further to determine a first weighting coefficient corresponding to the first intermediate predicted value, wherein the first weighting coefficient is associated with a first global distance between the pixel and the at least one of the plurality of first reference lines and a second global distance between the pixel and the at least one of the plurality of second reference lines; determine a second weighting coefficient corresponding to the second intermediate predicted value based on the first weighting coefficient; and determine the target predicted value of the pixel by weighting the first intermediate predicted value and the second intermediate predicted value based on the first weighting coefficient and the second weighting coefficient.

In some embodiments, to determine, for each of the plurality of pixels in the coding unit, the target predicted value of the pixel based on at least one of the plurality of first reference lines or the plurality of second reference lines, the at least one processor may be directed to cause the system further to determine, in response to determining that the prediction mode does not satisfy the prediction condition, the target predicted value of the pixel based on at least one of the plurality of first reference lines or at least one of the plurality of second reference lines.

In some embodiments, the at least one processor may be directed to cause the system further to determine whether a size of the coding unit is higher than a predetermined size and perform, in response to determining that size of the coding unit is higher than the predetermined size, a filtering operation on the plurality of first reference pixels of each of the plurality of first reference lines and the plurality of second reference pixels of each of the plurality of second reference lines.

In some embodiments, the at least one processor may be directed to cause the system further to determine whether the prediction mode satisfies a filtering condition and perform, in response to determining that the prediction mode satisfies the filtering condition, a filtering operation on the plurality of first reference pixels of each of the plurality of first reference lines and the plurality of second reference pixels of each of the plurality of second reference lines.

In some embodiments, the prediction mode may include a DC prediction mode, a planar prediction mode, and/or an angle prediction mode.

A further aspect of the present disclosure relates to a method implemented on a computing device including at least one processor, at least one storage medium, and a communication platform connected to a network. The method may include determining a coding unit in an image, the coding unit including a plurality of pixels; determining a plurality of first reference lines associated with the coding unit, the plurality of first reference lines being along a first side of the coding unit and each of the plurality of first reference lines including a plurality of first reference pixels; determining a plurality of second reference lines associated with the coding unit, the plurality of second reference lines being along a second side of the coding unit and each of the plurality of second reference lines including a plurality of second reference pixels; determining, for each of the plurality of pixels in the coding unit, a target predicted value of the pixel based on at least one of the plurality of first reference lines or the plurality of second reference lines according to a prediction mode; and determining a predicted coding unit corresponding to the coding unit based on a plurality of target predicted values of the plurality of pixels in the coding unit.

In some embodiments, the determining, for each of the plurality of pixels in the coding unit, the target predicted value of the pixel based on at least one of the plurality of first reference lines or the plurality of second reference lines may include determining whether the prediction mode satisfies a prediction condition; in response to determining that the prediction mode satisfies the prediction condition, determining a first intermediate predicted value of the pixel based on at least one of the plurality of first reference lines; determining a second intermediate predicted value of the pixel based on at least one of the plurality of second reference lines; and determining the target predicted value of the pixel based on the first intermediate predicted value and the second intermediate predicted value.

In some embodiments, the predetermined prediction condition may include that an angle of the prediction mode is within a predetermined range.

In some embodiments, the determining the first intermediate predicted value of the pixel based on at least one of the plurality of first reference lines may include determining, for each of the at least one of the plurality of first reference lines, a first initial predicted value corresponding to the pixel based on at least one of the plurality of first reference pixels on the first reference line; and determining the first intermediate predicted value of the pixel based on at least one first initial predicted value corresponding to the at least one of the plurality of first reference lines.

In some embodiments, the determining, for each of the at least one of the plurality of first reference lines, the first initial predicted value corresponding to the pixel based on at least one of the plurality of first reference pixels on the first reference line may include determining a first projected pixel corresponding to the pixel on the first reference line based on the prediction mode and determining a value of the first projected pixel as the first initial predicted value corresponding to the pixel.

In some embodiments, the determining, for each of the at least one of the plurality of first reference lines, the first initial predicted value corresponding to the pixel based on at least one of the plurality of first reference pixels on the first reference line may include determining two first reference pixels corresponding to the pixel on the first reference line based on the prediction mode and determining the first initial predicted value corresponding to the pixel by performing an interpolation on the two first reference pixels.

In some embodiments, the determining the first intermediate predicted value of the pixel based on at least one first initial predicted value corresponding to the at least one of the plurality of first reference lines may include determining, for each of the at least one first initial predicted value, a weighting coefficient corresponding to the first initial predicted value based on a distance between the pixel and a first reference line corresponding to the first initial predicted value according to the prediction mode; and determining the first intermediate predicted value of the pixel by weighting the at least one first initial predicted value based on at least one weighting coefficient corresponding to the at least one first initial predicted value.

In some embodiments, the determining the second intermediate predicted value of the pixel based on at least one of the plurality of second reference lines may include determining, for each of the at least one of the plurality of second reference lines, a second initial predicted value corresponding to the pixel based on at least one of the plurality of second reference pixels on the second reference line; and determining the second intermediate predicted value of the pixel based on at least one second initial predicted value corresponding to the at least one of the plurality of second reference lines.

In some embodiments, the determining, for each of the at least one of the plurality of second reference lines, the second initial predicted value corresponding to the pixel based on at least one of the plurality of second reference pixels on the second reference line may include determining a second projected pixel corresponding to the pixel on the second reference line based on the prediction mode and determining a value of the second projected pixel as the second initial predicted value corresponding to the pixel.

In some embodiments, the determining, for each of the at least one of the plurality of second reference lines, the second initial predicted value corresponding to the pixel based on at least one of the plurality of second reference pixels on the second reference line may include determining two second reference pixels corresponding to the pixel on the second reference line based on the prediction mode and determining the second initial predicted value corresponding to the pixel by performing an interpolation on the two second reference pixels.

In some embodiments, the determining the second intermediate predicted value of the pixel based on at least one second initial predicted value corresponding to the at least one of the plurality of second reference lines may include determining, for each of the at least one second initial predicted value, a weighting coefficient corresponding to the second initial predicted value based on a distance between the pixel and a second reference line corresponding to the second initial predicted value according to the prediction mode; and determining the second intermediate predicted value of the pixel by weighting the at least one second initial predicted value based on at least one weighting coefficient corresponding to the at least one second initial predicted value.

In some embodiments, the determining the target predicted value of the pixel based on the first intermediate predicted value and the second intermediate predicted value may include determining a first weighting coefficient corresponding to the first intermediate predicted value, wherein the first weighting coefficient is associated with a first global distance between the pixel and the at least one of the plurality of first reference lines and a second global distance between the pixel and the at least one of the plurality of second reference lines; determining a second weighting coefficient corresponding to the second intermediate predicted value based on the first weighting coefficient; and determining the target predicted value of the pixel by weighting the first intermediate predicted value and the second intermediate predicted value based on the first weighting coefficient and the second weighting coefficient.

In some embodiments, the determining, for each of the plurality of pixels in the coding unit, the target predicted value of the pixel based on at least one of the plurality of first reference lines or the plurality of second reference lines may include determining, in response to determining that the prediction mode does not satisfy the prediction condition, the target predicted value of the pixel based on at least one of the plurality of first reference lines or at least one of the plurality of second reference lines.

In some embodiments, the method further may include determining whether a size of the coding unit is higher than a predetermined size and performing, in response to determining that size of the coding unit is higher than the predetermined size, a filtering operation on the plurality of first reference pixels of each of the plurality of first reference lines and the plurality of second reference pixels of each of the plurality of second reference lines.

In some embodiments, the method further may include determining whether the prediction mode satisfies a filtering condition and performing, in response to determining that the prediction mode satisfies the filtering condition, a filtering operation on the plurality of first reference pixels of each of the plurality of first reference lines and the plurality of second reference pixels of each of the plurality of second reference lines.

In some embodiments, the prediction mode may include a DC prediction mode, a planar prediction mode, and/or an angle prediction mode.

A still further aspect of the present disclosure relates to a system for image coding. The system may include a coding unit determination module, a first reference line determination module, a second reference line determination module, a predicted value determination module, and a predicted coding unit determination module. The coding unit determination module may be configured to determine a coding unit in an image, the coding unit including a plurality of pixels. The first reference line determination module may be configured to determine a plurality of first reference lines associated with the coding unit, the plurality of first reference lines being along a first side of the coding unit and each of the plurality of first reference lines including a plurality of first reference pixels. The second reference line determination module may be configured to determine a plurality of second reference lines associated with the coding unit, the plurality of second reference lines being along a second side of the coding unit and each of the plurality of second reference lines including a plurality of second reference pixels. The predicted value determination module may be configured to determine, for each of the plurality of pixels in the coding unit, a target predicted value of the pixel based on at least one of the plurality of first reference lines or the plurality of second reference lines according to a prediction mode. The predicted coding unit determination module may be configured to determine a predicted coding unit corresponding to the coding unit based on a plurality of target predicted values of the plurality of pixels in the coding unit.

In some embodiments, to determine, for each of the plurality of pixels in the coding unit, the target predicted value of the pixel based on at least one of the plurality of first reference lines or the plurality of second reference lines, the predicted value determination module may be further configured to determine whether the prediction mode satisfies a prediction condition. In response to determining that the prediction mode satisfies the prediction condition, the predicted value determination module may be further configured to determine a first intermediate predicted value of the pixel based on at least one of the plurality of first reference lines; determine a second intermediate predicted value of the pixel based on at least one of the plurality of second reference lines; and determine the target predicted value of the pixel based on the first intermediate predicted value and the second intermediate predicted value.

In some embodiments, the predetermined prediction condition may include that an angle of the prediction mode is within a predetermined range.

In some embodiments, to determine the first intermediate predicted value of the pixel based on at least one of the plurality of first reference lines, the predicted value determination module may be further configured to determine, for each of the at least one of the plurality of first reference lines, a first initial predicted value corresponding to the pixel based on at least one of the plurality of first reference pixels on the first reference line; and determine the first intermediate predicted value of the pixel based on at least one first initial predicted value corresponding to the at least one of the plurality of first reference lines.

In some embodiments, to determine, for each of the at least one of the plurality of first reference lines, the first initial predicted value corresponding to the pixel based on at least one of the plurality of first reference pixels on the first reference line, the predicted value determination module may be further configured to determine a first projected pixel corresponding to the pixel on the first reference line based on the prediction mode and determine a value of the first projected pixel as the first initial predicted value corresponding to the pixel.

In some embodiments, to determine, for each of the at least one of the plurality of first reference lines, the first initial predicted value corresponding to the pixel based on at least one of the plurality of first reference pixels on the first reference line, the predicted value determination module may be further configured to determine two first reference pixels corresponding to the pixel on the first reference line based on the prediction mode and determine the first initial predicted value corresponding to the pixel by performing an interpolation on the two first reference pixels.

In some embodiments, to determine the first intermediate predicted value of the pixel based on at least one first initial predicted value corresponding to the at least one of the plurality of first reference lines, the predicted value determination module may be further configured to determine, for each of the at least one first initial predicted value, a weighting coefficient corresponding to the first initial predicted value based on a distance between the pixel and a first reference line corresponding to the first initial predicted value according to the prediction mode; and determine the first intermediate predicted value of the pixel by weighting the at least one first initial predicted value based on at least one weighting coefficient corresponding to the at least one first initial predicted value.

In some embodiments, to determine the second intermediate predicted value of the pixel based on at least one of the plurality of second reference lines, the predicted value determination module may be further configured to determine, for each of the at least one of the plurality of second reference lines, a second initial predicted value corresponding to the pixel based on at least one of the plurality of second reference pixels on the second reference line; and determine the second intermediate predicted value of the pixel based on at least one second initial predicted value corresponding to the at least one of the plurality of second reference lines.

In some embodiments, to determine, for each of the at least one of the plurality of second reference lines, the second initial predicted value corresponding to the pixel based on at least one of the plurality of second reference pixels on the second reference line, the predicted value determination module may be further configured to determine a second projected pixel corresponding to the pixel on the second reference line based on the prediction mode and determine a value of the second projected pixel as the second initial predicted value corresponding to the pixel.

In some embodiments, to determine, for each of the at least one of the plurality of second reference lines, the second initial predicted value corresponding to the pixel based on at least one of the plurality of second reference pixels on the second reference line, the predicted value determination module may be further configured to determine two second reference pixels corresponding to the pixel on the second reference line based on the prediction mode and determine the second initial predicted value corresponding to the pixel by performing an interpolation on the two second reference pixels.

In some embodiments, to determine the second intermediate predicted value of the pixel based on at least one second initial predicted value corresponding to the at least one of the plurality of second reference lines, the predicted value determination module may be further configured to determine, for each of the at least one second initial predicted value, a weighting coefficient corresponding to the second initial predicted value based on a distance between the pixel and a second reference line corresponding to the second initial predicted value according to the prediction mode; and determine the second intermediate predicted value of the pixel by weighting the at least one second initial predicted value based on at least one weighting coefficient corresponding to the at least one second initial predicted value.

In some embodiments, to determine the target predicted value of the pixel based on the first intermediate predicted value and the second intermediate predicted value, the predicted value determination module may be further configured to determine a first weighting coefficient corresponding to the first intermediate predicted value, wherein the first weighting coefficient is associated with a first global distance between the pixel and the at least one of the plurality of first reference lines and a second global distance between the pixel and the at least one of the plurality of second reference lines; determine a second weighting coefficient corresponding to the second intermediate predicted value based on the first weighting coefficient; and determine the target predicted value of the pixel by weighting the first intermediate predicted value and the second intermediate predicted value based on the first weighting coefficient and the second weighting coefficient.

In some embodiments, to determine, for each of the plurality of pixels in the coding unit, the target predicted value of the pixel based on at least one of the plurality of first reference lines or the plurality of second reference lines, the predicted value determination module may be further configured to determine, in response to determining that the prediction mode does not satisfy the prediction condition, the target predicted value of the pixel based on at least one of the plurality of first reference lines or at least one of the plurality of second reference lines.

In some embodiments, the first reference line determination module or the second reference line determination module may be further configured to determine whether a size of the coding unit is higher than a predetermined size and perform, in response to determining that size of the coding unit is higher than the predetermined size, a filtering operation on the plurality of first reference pixels of each of the plurality of first reference lines and the plurality of second reference pixels of each of the plurality of second reference lines.

In some embodiments, the first reference line determination module or the second reference line determination module may be further configured to determine whether the prediction mode satisfies a filtering condition and perform, in response to determining that the prediction mode satisfies the filtering condition, a filtering operation on the plurality of first reference pixels of each of the plurality of first reference lines and the plurality of second reference pixels of each of the plurality of second reference lines.

In some embodiments, the prediction mode may include a DC prediction mode, a planar prediction mode, and/or an angle prediction mode.

A still further aspect of the present disclosure relates to a non-transitory computer readable medium including executable instructions. When the executable instructions are executed by at least one processor, the executable instructions may direct the at least one processor to perform a method. The method may include determining a coding unit in an image, the coding unit including a plurality of pixels; determining a plurality of first reference lines associated with the coding unit, the plurality of first reference lines being along a first side of the coding unit and each of the plurality of first reference lines including a plurality of first reference pixels; determining a plurality of second reference lines associated with the coding unit, the plurality of second reference lines being along a second side of the coding unit and each of the plurality of second reference lines including a plurality of second reference pixels; determining, for each of the plurality of pixels in the coding unit, a target predicted value of the pixel based on at least one of the plurality of first reference lines or the plurality of second reference lines according to a prediction mode; and determining a predicted coding unit corresponding to the coding unit based on a plurality of target predicted values of the plurality of pixels in the coding unit.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
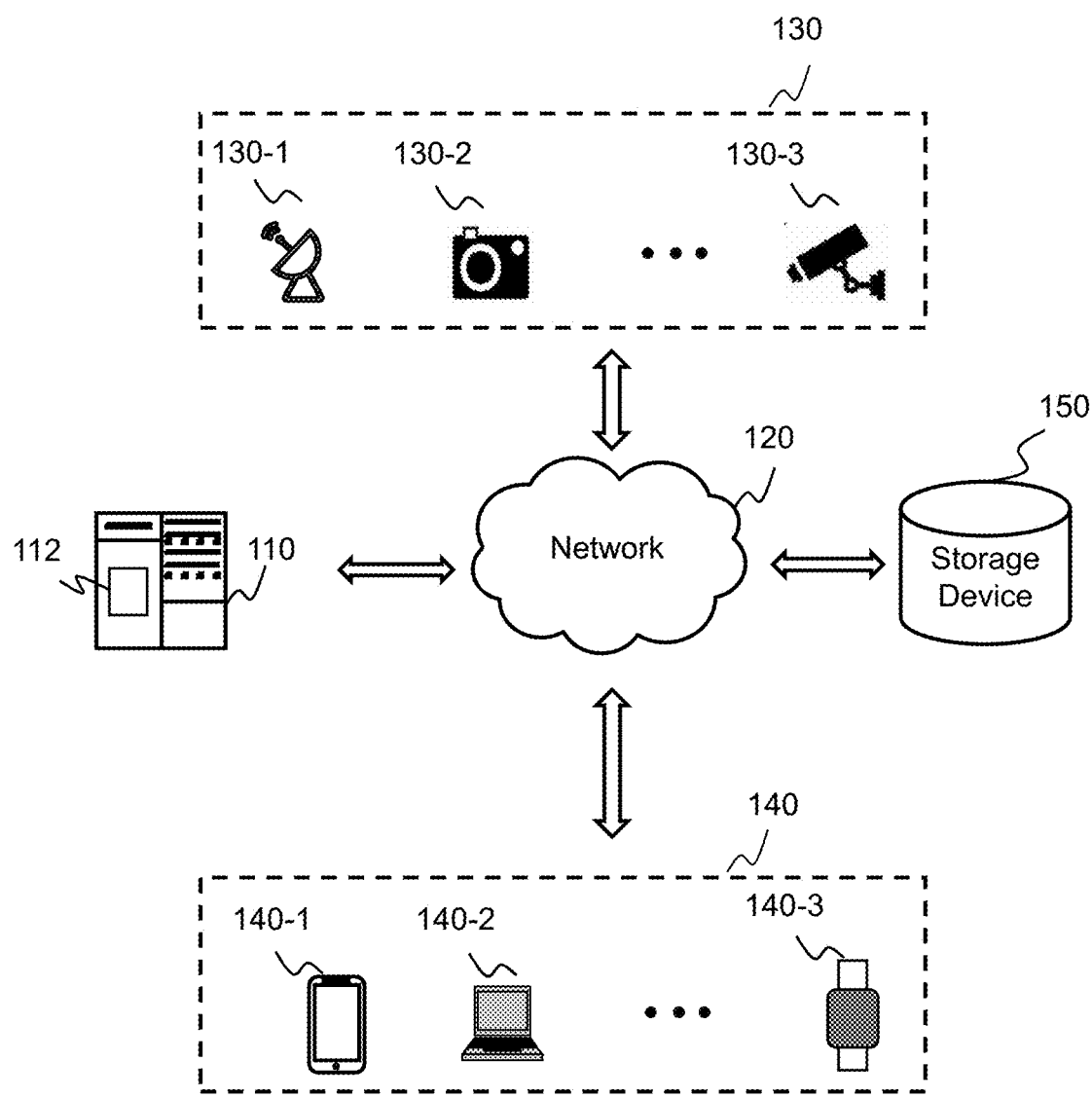
FIG. 1 is a schematic diagram illustrating an exemplary image coding system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the terms "system," "engine," "unit," "module," and/or "block" used herein are one method to distinguish different components, elements, parts, sections, or assemblies of different levels in ascending order. However, the terms may be displaced by other expression if they may achieve the same purpose.

Generally, the words "module," "unit," or "block" used herein, refer to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 220 illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, an engine, a module, or a block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms "first", "second", or the like, are only used for the purpose of differentiation, and cannot be interpreted as indicating or implying relative importance, nor can be understood as indicating or implying the order.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

An aspect of the present disclosure relates to systems and methods for image coding. The system may determine a coding unit in an image, the coding unit including a plurality of pixels. Along a first side (e.g., a left side) of the coding unit, the system may determine a plurality of first reference lines associated with the coding unit, each of the plurality of first reference lines including a plurality of first reference pixels. Along a second side (e.g., an upper side) of the coding unit, the system may determine a plurality of second reference lines associated with the coding unit, each of the plurality of second reference lines including a plurality of second reference pixels. For each of the plurality of pixels in the coding unit, the system may determine a predicted value of the pixel based on at least one of the plurality of first reference lines or the plurality of second reference lines according to a predetermined prediction mode (e.g., a DC prediction mode, a planar prediction mode, or an angle prediction mode). According to a plurality of predicted values of the plurality of pixels in the coding unit, the system may determine a predicted coding unit corresponding to the coding unit. Further, the system may code the image based on a plurality of predicted coding units corresponding to a plurality of coding units in the image. According to the systems and methods of the present disclosure, the plurality of first reference lines are used for coding the image, thereby improving the efficiency and the accuracy of the image coding.

FIG. 1 is a schematic diagram illustrating an exemplary image coding system according to some embodiments of the present disclosure. As shown, the image coding system 100 may include a server 110, a network 120, an acquisition device 130, a user device 140, and a storage device 150.

The server 110 may be a single server or a server group. The server group may be centralized or distributed (e.g., the server 110 may be a distributed system). In some embodiments, the server 110 may be local or remote. For example, the server 110 may access information and/or data stored in the acquisition device 130, the user device 140, and/or the storage device 150 via the network 120. As another example, the server 110 may be directly connected to the acquisition device 130, the user device 140, and/or the storage device 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 including one or more components illustrated in FIG. 2 of the present disclosure.

In some embodiments, the server 110 may include a processing device 112. The processing device 112 may process information and/or data relating to image coding to perform one or more functions described in the present disclosure. For example, the processing device 112 may determine a coding unit in an image, a plurality of first reference lines associated with the coding unit, and a plurality of second reference lines associated with the coding unit. Further, the processing device 112 may determine a predicted coding unit corresponding to the coding unit based on the plurality of first reference lines and the plurality of second reference lines. In some embodiments, the processing device 112 may include one or more processing devices (e.g., single-core processing device(s) or multi-core processor(s)). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiment, the sever 110 may be unnecessary and all or part of the functions of the server 110 may be implemented by other components (e.g., the acquisition device 130, the user device 140) of the image coding system 100. For example, the processing device 112 may be integrated into the acquisition device 130 or the user device 140 and the functions (e.g., determining the coding unit in the image) of the processing device 112 may be implemented by the acquisition device 130 or the user device 140.

The network 120 may facilitate exchange of information and/or data for the image coding system 100. In some embodiments, one or more components (e.g., the server 110, the acquisition device 130, the user device 140, the storage device 150) of the image coding system 100 may transmit information and/or data to other component(s) of the image coding system 100 via the network 120. For example, the server 110 may obtain an image to be coded from the acquisition device 130 via the network 120. As another example, the server 110 may obtain a prediction mode associated with the image coding from the storage device 150. In some embodiments, the network 120 may be any type of wired or wireless network, or combination thereof. Merely by way of example, the network 120 may include a cable network (e.g., a coaxial cable network), a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof.

The acquisition device 130 may be configured to acquire an image (the "image" herein refers to a single image or a frame of a video). In some embodiments, the acquisition device 130 may include a camera 130-1, a video recorder 130-2, a sensor 130-3, etc. The camera 130-1 may include a gun camera, a dome camera, an integrated camera, a monocular camera, a binocular camera, a multi-view camera, or the like, or any combination thereof. The video recorder 130-2 may include a PC Digital Video Recorder (DVR), an embedded DVR, or the like, or any combination thereof. The sensor 130-1 may include an acceleration sensor (e.g., a piezoelectric sensor), a velocity sensor (e.g., a Hall sensor), a distance sensor (e.g., a radar, an infrared sensor), a steering angle sensor (e.g., a tilt sensor), a traction-related sensor (e.g., a force sensor), or the like, or any combination thereof. The image acquired by the acquisition device 130 may be a two-dimensional image, a three-dimensional image, a four-dimensional image, etc. In some embodiments, the acquisition device 130 may include a plurality of components each of which can acquire an image. For example, the acquisition device 130 may include a plurality of sub-cameras that can capture images or videos simultaneously. In some embodiments, the acquisition device 130 may transmit the acquired image to one or more components (e.g., the server 110, the user device 140, the storage device 150) of the image coding system 100 via the network 120.

The user device 140 may be configured to receive information and/or data from the server 110, the acquisition device 130, and/or the storage device 150 via the network 120. For example, the user device 140 may receive a coded image determined based on a plurality of predicted coding units corresponding to a plurality of coding units in the image from the server 110. In some embodiments, the user device 140 may process information and/or data received from the server 110, the acquisition device 130, and/or the storage device 150 via the network 120. For example, the user device 140 may decode the coded image received from the server 110. In some embodiments, the user device 140 may provide a user interface via which a user may view information and/or input data and/or instructions to the image coding system 100. For example, the user may view the decoded image via the user interface. As another example, the user may input an instruction associated with an image coding parameter via the user interface. In some embodiments, the user device 140 may include a mobile phone 140-1, a computer 140-2, a wearable device 140-3, or the like, or any combination thereof. In some embodiments, the user device 140 may include a display that can display information in a human-readable form, such as text, image, audio, video, graph, animation, or the like, or any combination thereof. The display of the user device 140 may include a cathode ray tube (CRT) display, a liquid crystal display (LCD), a light emitting diode (LED) display, a plasma display panel (PDP), a three dimensional (3D) display, or the like, or a combination thereof. In some embodiments, the user device 140 may be connected to one or more components (e.g., the server 110, the acquisition device 130, the storage device 150) of the image coding system 100 via the network 120.

The storage device 150 may be configured to store data and/or instructions. The data and/or instructions may be obtained from, for example, the server 110, the acquisition device 130, and/or any other component of the image coding system 100. In some embodiments, the storage device 150 may store data and/or instructions that the server 110 may execute or use to perform exemplary methods described in the present disclosure. For example, the storage device 150 may store the prediction mode associated with the image coding. In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components (e.g., the server 110, the acquisition device 130, the user device 140) of the image coding system 100. One or more components of the image coding system 100 may access the data or instructions stored in the storage device 150 via the network 120. In some embodiments, the storage device 150 may be directly connected to or communicate with one or more components (e.g., the server 110, the acquisition device 130, the user device 140) of the image coding system 100. In some embodiments, the storage device 150 may be part of other components of the image coding system 100, such as the server 110, the acquisition device 130, or the user device 140.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 2:
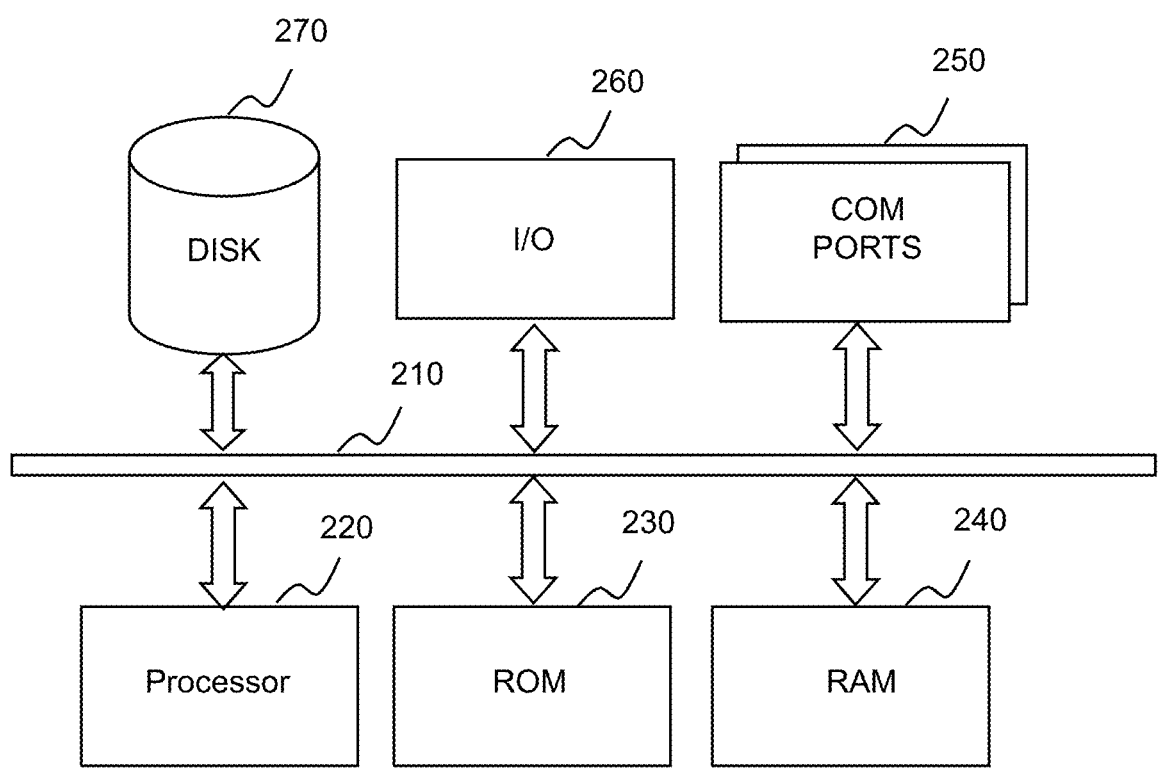
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the server 110 may be implemented on the computing device 200. For example, the processing device 112 may be implemented on the computing device 200 and configured to perform functions of the processing device 112 disclosed in this disclosure.

The computing device 200 may be used to implement any component of the image coding system 100 as described herein. For example, the processing device 112 may be implemented on the computing device 200, via its hardware, software program, firmware, or a combination thereof. Although only one such computer is shown, for convenience, the computer functions relating to image coding as described herein may be implemented in a distributed fashion on a number of similar platforms to distribute the processing load.

The computing device 200, for example, may include COM ports 250 connected to and from a network connected thereto to facilitate data communications. The computing device 200 may also include a processor (e.g., a processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, a read-only memory (ROM) 230, or a random-access memory (RAM) 240, for storing various data files to be processed and/or transmitted by the computing device 200. The computing device 200 may also include program instructions stored in the ROM 230, RAM 240, and/or another type of non-transitory storage medium to be executed by the processor 220. The methods and/or processes of the present disclosure may be implemented as the program instructions. The computing device 200 may also include an I/O component 260, supporting input/output between the computing device 200 and other components. The computing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the computing device 200 executes both step A and step B, it should be understood that step A and step B may also be performed by two different processors 220 jointly or separately in the computing device 200 (e.g., a first processor executes step A and a second processor executes step B, or the first and second processors jointly execute steps A and B).

Figure 3:
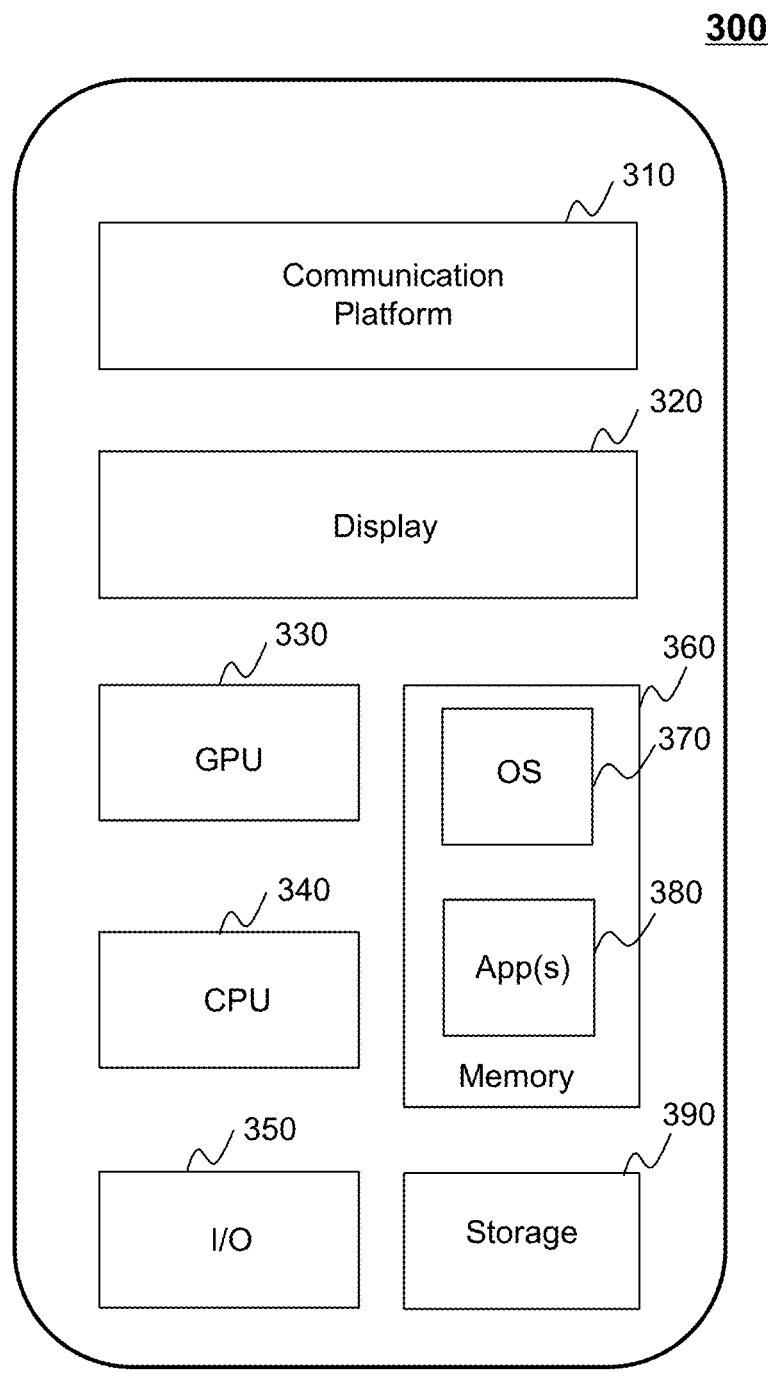
FIG. 3 is a schematic diagram illustrating exemplary hardware and/or software components of an exemplary terminal device according to some embodiments of the present disclosure.

FIG. 3 is a schematic diagram illustrating exemplary hardware and/or software components of an exemplary terminal device according to some embodiments of the present disclosure. In some embodiments, the user device 140 may be implemented on the terminal device 300 shown in FIG. 3.

As illustrated in FIG. 3, the terminal device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the terminal device 300.

In some embodiments, an operating system 370 (e.g., iOS™, Android™, Windows Phone™) and one or more applications (Apps) 380 may be loaded into the memory 360 from the storage 390 in order to be executed by the CPU 340. The applications 380 may include a browser or any other suitable mobile apps for receiving and rendering information relating to image coding or other information from the processing device 112. User interactions may be achieved via the I/O 350 and provided to the processing device 112 and/or other components of the image coding system 100 via the network 120.

Figure 4:
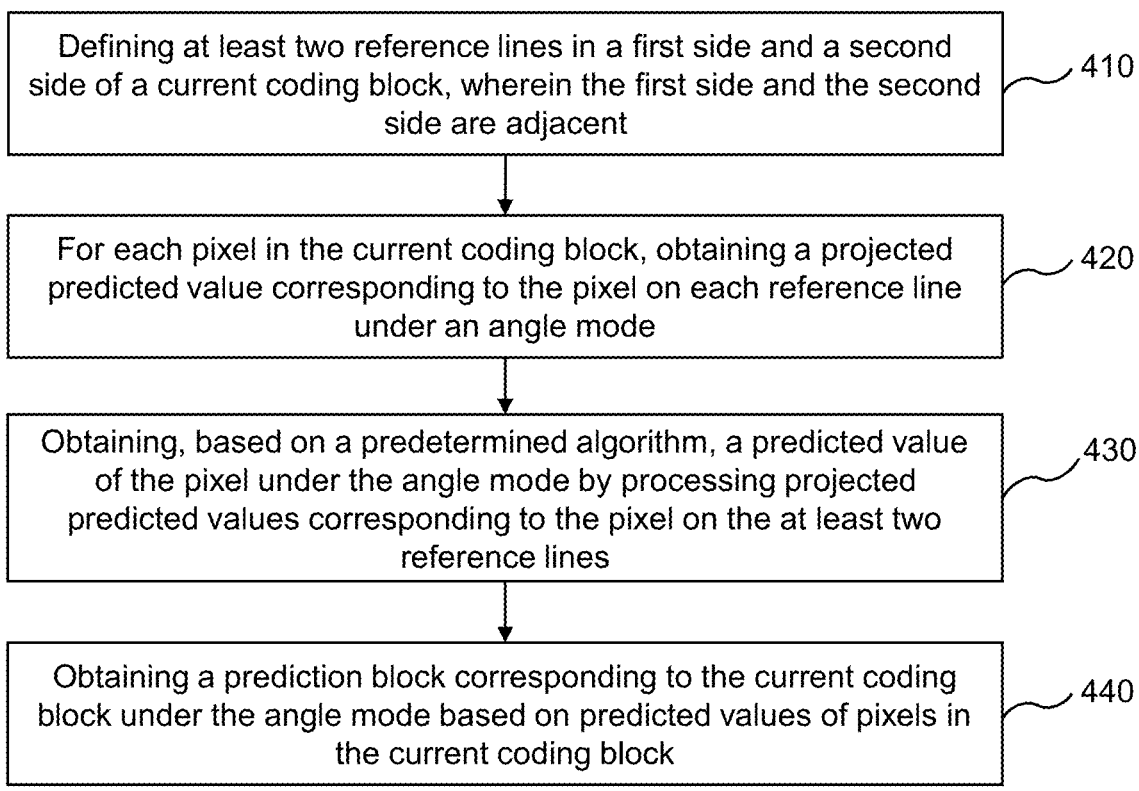
FIG. 4 is a flowchart illustrating an exemplary process for intra prediction according to some embodiments of the present disclosure.

FIG. 4 is a flowchart illustrating an exemplary process for intra prediction according to some embodiments of the present disclosure. In some embodiments, the process 400 may be implemented as a set of instructions (e.g., an application) stored in the storage ROM 230 or RAM 240. The processor 220 and/or the modules in FIG. 11 may execute the set of instructions, and when executing the instructions, the processor 220 and/or the modules may be configured to perform the process 400. The operations of the illustrated process presented below are intended to be illustrative. In some embodiments, the process 400 may be accomplished with one or more additional operations not described and/or without one or more of the operations herein discussed. Additionally, the order in which the operations of the process as illustrated in FIG. 4 and described below is not intended to be limiting.

In 410, at least two reference lines may be defined on each of a first side (e.g., a left side) and a second side (e.g., an upper side) of a current coding block (also referred to as a "coding unit"), wherein the first side and the second side are adjacent. In some embodiments, the at least two reference lines may be defined by the processing device 112 (e.g., a first reference line determination module 1120 and a second reference line determination module 1130 illustrated in FIG. 11) (e.g., the processing circuits of the processor 220).

As used here, "coding block" may also be referred to as a "coding unit (CU)." The current coding block may also be referred to as a current block. In some embodiments, the current coding block may refer to a block to be encoded in an image and the current coding block may include a plurality of pixels. The first side and the second side of the current coding block may be physically adjacent rather than parallel to each other. For example, if the first side is the left side of the current coding block, the second side may be the upper side or a lower side of the current coding block, not a right side of the current coding block. In some embodiments, since a reference line needs to include as many encoded pixels as possible, the first side and/or the second side of the current coding block may be determined based on an order of coding/decoding the image (e.g., a frame of a video). For example, if the order of coding/decoding the image is from the left to the right and from the top to the bottom, the first side may be the left side of the current coding block and the second side may be the upper side of the current coding block or the first side may be the upper side of the current coding block and the second side may be the left side of the current coding block.

In some embodiments, the at least two reference lines may include at least two first reference lines located on the left side of the current coding block and at least two second reference lines located on the upper side of the current coding block. A count (or number) of reference pixels on a first reference line closest to the current coding block may be denoted as Ml and a count (or number) of reference pixels on a second reference line closest to the current coding block may be denoted as Mt. A count (or number) of reference pixels on an nth first reference line denoted as Mln and a count of reference pixels on an nth second reference line denoted as Mtn may be determined based on the Ml and Mt, respectively according to formula (1) below:

$$\begin{cases} whRatio = \max(1, width/height) \\ hwRatio = \max(1, height/width) \\ Mln = Ml + (hwRatio + 1)*(n-1) \\ Mtn = Mt + (whRatio + 1)*(n-1) \end{cases} \quad (1)$$

where width refers to a width of the current coding block (e.g., a count of pixels in the current coding block along the width of the current coding block), and height refers to a height of the current coding block (e.g., a count of pixels in the current coding block along the height of the current coding block), Mln refers to a count of reference pixels on the nth first reference line, and Mtn refers to a count of reference pixels on the nth second reference line. In some embodiments, Mln and Mtn may be determined according to different situations. For example, Mln and/or Mtn may be a sum of width and height. As another example, Mln=2*height and Mtn=2*width. In some embodiments, Mln or Mtn may be set as a larger number, so that at least one reference pixel in the current coding block may be determined along an opposite direction of an angle mode (also referred to as an "angle prediction mode") larger than the vertical angle mode and less than the horizontal angle mode.

In some embodiments, each of the at least two reference lines may include a plurality of reference pixels. The pixel value of each of the plurality of reference pixels may be determined before subsequent operations are executed. The pixel value of a reference pixel may be determined based on one or more pixel values of encoded pixels. In some embodiments, for a reference line, the pixel values of reference pixels on the reference line may be determined successively according to a specified direction (e.g., from bottom to top, from left to right). When the pixel value of a reference pixel is determined to be not available, i.e., the reference pixel has not been encoded, the pixel value of the reference pixel may be determined based on a pixel value of an encoded reference pixel or set as a default value. For example, for a lth reference pixel in a reference line, if the pixel value of the lth reference pixel is determined to be not available, whether pixel values of other reference pixels on the reference line are available may be determined one by one along a specified direction (e.g., from bottom to top, from left to right) until a pixel value of a mth reference pixel on the reference line is determined to be available. Pixel values of reference pixels between the lth reference pixel and the mth reference pixel on the reference line may be set as the pixel value of the mth reference pixel. If the pixel values of other reference pixels on the reference line are determined to be not available, the pixel value of the lth reference pixel on the reference line may be set as a default value. As another example, for a non-lth reference pixel in a reference line, if the pixel value of the non-lth reference pixel is determined to be not available, the pixel value of the non-lth reference pixel may be set as a pixel value of a reference pixel prior to the non-lth reference pixel along the specified direction.

In some embodiments, after pixel values of the plurality of reference pixels on each of the at least two reference lines are determined, whether a filtering operation needs to be performed on the plurality of reference pixels may be determined. In some embodiments, whether a filtering operation needs to be performed on the plurality of reference pixels of a reference line may be determined based on a size of the current coding block or an intra prediction mode (also referred to as a "prediction mode") associated with the current coding block. For example, the smaller the size of the current coding block, the less likely the filtering operation may be needed. Further, if the size of the current coding block is less than a threshold, the filtering operation may not need to be performed on the plurality of reference pixels of a reference line. As another example, the closer the intra prediction mode to the horizontal or vertical direction, the less likely the filtering operation may be needed. Further, if a deviation between the intra prediction model and the horizontal or vertical direction is less than a threshold, the filtering operation may not need to be performed on the plurality of reference pixels of a reference line. As used herein, the filtering operation may include a low pass filtering technique (e.g., a smoothing filtering operation). In some embodiments, the filtering technique used in the filtering operation corresponding to each of the at least two reference lines associated with the current coding block may be same. In some embodiments, the filtering operation may reduce noises of an obtained prediction block corresponding to the current coding block and a direction boundary (e.g., a directional stripe) generated in the obtained prediction block while preserving detail features of the obtained prediction block as much as possible.

In 420, for each pixel in the current coding block, an initial predicted value (also referred to as a "projected predicted value") of the pixel on each reference line may be obtained under an angle mode (also referred to as an "angle prediction mode"). In some embodiments, the initial predicted value of the pixel may be obtained by the processing device 112 (e.g., a predicted value determination module 1140 illustrated in FIG. 11) (e.g., the processing circuits of the processor 220).

In some embodiments, the intra prediction mode may include a DC prediction mode (also referred to as an "intra_DC mode"), a planar prediction mode (also referred to as an "intra_planar mode"), or multiple angle modes, etc. In some embodiments, the intra prediction mode with a sequence number in 2-H (H is an integer larger than 2) may be an angle mode and the sequence number may indicate a direction of the angle mode. Angle modes having different sequence numbers may have different directions, which can eliminate spatial redundancy of the current coding block in different directions.

In some embodiments, taking a specific pixel p in the current coding block as an example, the initial predicted value of the pixel p on each of at least two reference lines may include a first initial predicted value in a direction of the angle mode. If the pixel p satisfies a bidirectional prediction condition, the initial predicted value of the pixel p on each of the at least two reference lines may further include a second initial predicted value in an opposite direction of the angle mode. In some embodiments, a pixel that satisfies the bidirectional prediction condition may be referred to as a compensation pixel and a pixel that does not satisfy the bidirectional prediction condition may be referred to as a non-compensation pixel.

In some embodiments, a first projection location of the pixel p on the nth reference line may be obtained by projecting the pixel p onto the nth reference line along a direction of angle mode. The "pixel value" corresponding to the first projection location may be the first initial predicted value of the pixel p on the nth reference line. The first projection location may also be referred to as a location corresponding to the first initial predicted value. In some embodiments, a direction of a vector from the pixel p to the first projection location may be the same as the direction of the angle mode.

In some embodiments, a second projection location of the pixel p on the nth reference line may be obtained by projecting the pixel p onto the nth reference line along an opposite direction of angle mode. The "pixel value" corresponding to the second projection location may be the second projected prediction pixel value of the pixel p on the nth reference line. The second projection location may also be referred to as a location corresponding to the second initial predicted value. In some embodiments, a difference between the direction of the angle mode and a direction of a vector from the pixel p to the second projection location may be 180°.

In some embodiments, the first side (e.g., y axis) and the second side (e.g., x axis) of the current coding block may constitute a coordinate system. If coordinates of a projection location (i.e., a location corresponding to an initial predicted value) (e.g., the first projection location, the second projection location) in the coordinate system are integers (i.e., the projection location corresponds to a reference pixel), the corresponding initial predicted value (i.e., the "pixel value" corresponding to the projection location) may be a pixel value of the reference pixel. If at least one coordinate of the projection location in the coordinate system is not integer (i.e., the projection location is between two reference pixels), the corresponding initial predicted value (i.e., the "pixel value" corresponding to the projection location) may be an interpolation result of pixel values of the two reference pixels that are on the same reference line and adjacent to the projection location. In some embodiments, the interpolation result may be determined according to formula (2) below:

$$y=((N-\text{deltaFract})*n1+\text{deltaFract}*n2+(N>>1))>>\text{Log}_2 N \qquad (2),$$

where y refers to is the interpolation result, n1 refers to a pixel value of a first reference pixel adjacent to the projection location, n2 refers to a pixel value of a second reference pixel adjacent to the projection location, N refers to an interpolation accuracy, deltaFract refers to a distance between the projection location and the first adjacent reference pixel, >> refers to a right shift operator, the left of >> is an object to be shift right, and the right of >> is a right shift digit. A value of N may be a positive integer power of 2, such as 8, 16, 32, 64, or the like. A value of the deltaFract may be in a range of [0, N−1]. In some embodiments, the first reference pixel and the second reference pixel may be two adjacent reference pixels on the same reference line. The coordinates of the projected location may be between the first reference pixel and the second reference pixel adjacent to the first reference pixel, and the first reference pixel may be on the first side or second side of the projected location. More descriptions of determining the initial predicted value may be found elsewhere in the present disclosure (e.g., FIG. 8 and the descriptions thereof).

In some embodiments, for each pixel in the current block, the initial predicted value of the pixel on each reference line may be determined according to the above operations.

In some embodiments, the bidirectional prediction condition may include that a sequence number of the angle mode is within a predetermined range and the pixel is within a compensation region. The compensation region may be set according to actual needs. A size of the compensation region cannot be larger than a size of the current block, and each of pixels in the compensation region may have a second projection location.

In some embodiments, the predetermined range may include a first range and/or a second range. The first range may be between a sequence number of an angle mode in a vertical direction and a sequence number of an angle mode in a first diagonal direction and may not include the sequence number of the angle mode in the vertical direction. The second range may be between a sequence number of an angle mode in a horizontal direction and a sequence number of an angle mode in a second diagonal direction and may not include the sequence number of the angle mode in the horizontal direction. An angle between the first diagonal direction and the vertical direction may be 45° and an angle between the second diagonal direction and the horizontal direction is 45°. Both the first diagonal direction and the second diagonal direction may be not between the vertical direction and the horizontal direction. More descriptions of the predetermined range may be found elsewhere in the present disclosure (e.g., FIG. 5 and the descriptions thereof).

In 430, for each pixel in the current coding block, a target predicted value (also referred to as an "angle mode predicted value" or a "predicted value") of the pixel may be obtained under the angle mode by processing initial predicted values of the pixel on the at least two reference lines using a predetermined algorithm. In some embodiments, the target predicted value of the pixel may be obtained by the processing device 112 (e.g., the predicted value determination module 1140 illustrated in FIG. 11) (e.g., the processing circuits of the processor 220).

In some embodiments, the target predicted value of the pixel may be obtained under the angle mode by performing a weighted averaging operation on the initial predicted values of the pixel on the at least two reference lines. When weighting coefficients of the initial predicted values of the pixel are normalized, the weighted averaging operation may also be referred to as a weighted summation operation.

In some embodiments, taking the specific pixel p in the current coding block as an example, regardless of whether the pixel p satisfies the bidirectional prediction condition, the target predicted value of the pixel p may be obtained by performing the weighted averaging operation on the initial predicted values of the pixel p on the at least two reference lines.

In some embodiments, if the pixel p satisfies the bidirectional prediction condition (i.e., the pixel p is a compensation pixel), a first intermediate predicted value (also referred to as a "first predicted value") of the pixel p may be obtained by performing a first weighted averaging operation on first initial predicted values of the pixel p on the at least two e reference lines. Further, a second intermediate predicted value (also referred to as a "second predicted value") of the pixel p may be obtained by performing a second weighted averaging operation on second initial predicted values of the pixel p on the at least two reference lines. Weighting coefficients in the first weighted averaging operation may be related or may be irrelevant to weighting coefficients in the second weighted averaging operation. The target predicted value of the pixel p may be further obtained by performing a third weighted averaging operation on the first intermediate predicted value and the second intermediate predicted value.

In some embodiments, in the third weighted averaging operation, a weighting coefficient of the first intermediate predicted value may be negatively related to a first distance between the pixel p and a first projection location on one of the plurality of first reference lines. A weighting coefficient of the second intermediate predicted value may be negatively related to a second distance between the pixel p and a second projection location on one of the plurality of second reference lines. The weighting coefficient of the second intermediate predicted value and the weighting coefficient of the first intermediate predicted value may be determined in a linear manner according to formula (3) below:

$$\begin{cases} \gamma 2 = \alpha * d1/(d1 + d2) \\ \gamma 1 = 1 - \gamma 2 \end{cases} \quad (3)$$

where $\gamma 2$ refers to the weighting coefficient of the second intermediate predicted value, $\gamma 1$ refers to the weighting coefficient of the first intermediate predicted value, $\alpha$ refers to a weight influence factor of the first intermediate predicted value, d1 refers to a shortest one among first distances between the pixel p and first projection locations on the plurality of first reference lines, and d2 refers to a shortest one among second distances between the pixel p and second projection locations on the plurality of second reference lines. In some embodiments, the weighting coefficient of the second intermediate predicted value and the weighting coefficient of the first intermediate predicted value may be determined in other manners, such as an exponential manner. In some embodiments, d1 and d2 may be determined using a similar triangle, a trigonometric function, etc.

In the above embodiments, the weighting coefficient of the second intermediate predicted value and the weighting coefficient of the first intermediate predicted value may be determined based on the first distances and the second distances, which improves the accuracy of the determined weighting coefficients and the accuracy of the target predicted value of the compensation pixel, thereby improving the effect of reducing the spatial redundancy of the current coding block.

In 440, a prediction block (also referred to as a "predicted coding unit") corresponding to the current coding block may be obtained based on the target predicted values of pixels in the current coding block. In some embodiments, the prediction block corresponding to the current coding block may be obtained by the processing device 112 (e.g., the predicted coding unit determination module 1150 illustrated in FIG. 11) (e.g., the processing circuits of the processor 220).

A count of pixels of the prediction block corresponding to the current coding block may be the same as a count of pixels of the current coding block and a pixel value of each pixel in the prediction block may be the target predicted value of the pixel in the current coding block.

In some embodiments, an evaluation index (e.g., a rate-distortion (RD) cost) of an intra compression effect corresponding to the angle mode may be calculated based on the current coding block and the prediction block under the angle mode corresponding to the current coding block. Further, a prediction mode with a minimum evaluation index may be selected as the intra prediction mode of the current coding block by comparing the evaluation index corresponding to the angle mode with evaluation indexes corresponding to other prediction modes.

In the present disclosure, at least two reference lines associated with the current coding block may be defined and target predicted values of the pixels in the current coding block may be determined based on a correlation between pixels in the current coding block and reference pixels in each of the at least two reference lines, which expands a distribution range of the reference pixels and improves the possibility of selecting the optimal intra prediction mode from a plurality of prediction modes, thereby improving the effect of reducing the spatial redundancy of the current coding block.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 5:
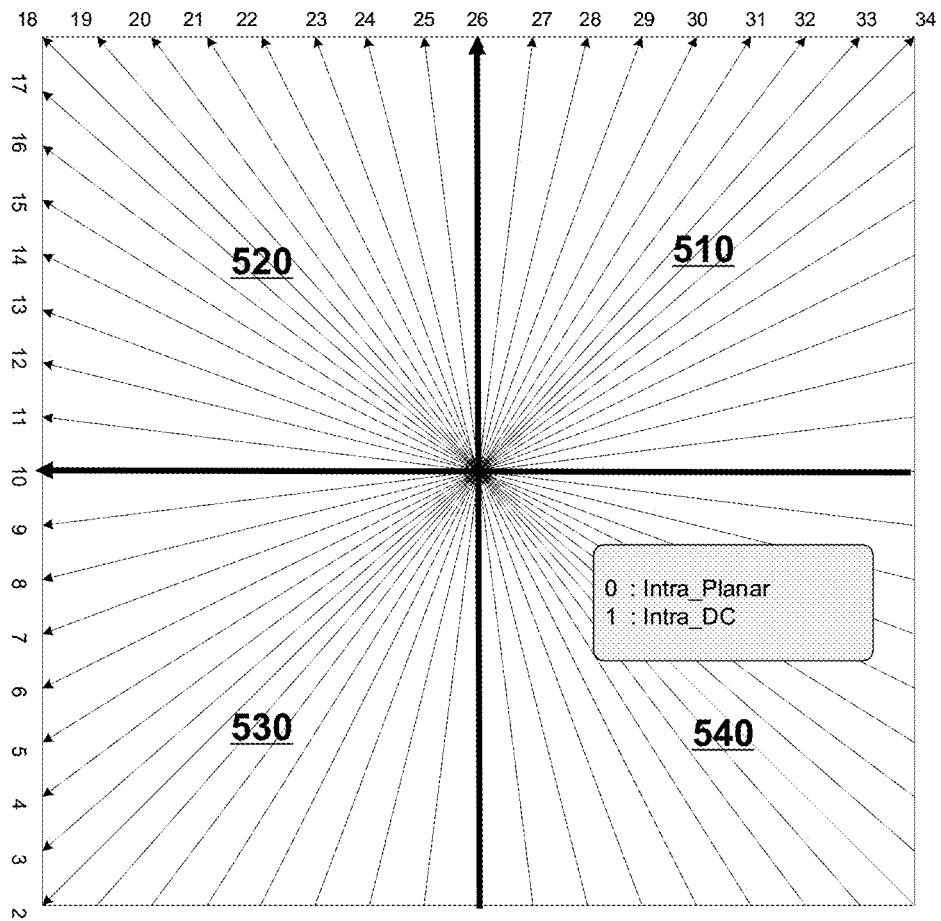
FIG. 5 is a schematic diagram illustrating exemplary directions of angle modes with different sequence numbers according to some embodiments of the present disclosure.

FIG. 5 is a schematic diagram illustrating exemplary directions of angle modes with different sequence numbers according to some embodiments of the present disclosure. At least two reference lines may be located on the left side and the upper side of the current coding block. In some embodiments, intra prediction modes with sequence numbers H from 2 to 34 are angle modes, an intra prediction mode of H=0 is an intra_DC mode, and an intra prediction mode of H=1 is an intra_planar mode. As illustrated in FIG. 5, the current coding block may be divided into 4 quadrants (e.g., a first quadrant 510, a second quadrant 520, a third quadrant 530, a fourth quadrant 540). A direction (also referred to as a "second diagonal direction") of an angle mode with a sequence number 2 is a lower left direction or a diagonal direction of the third quadrant 530. A direction of an angle mode with a sequence number 10 is a horizontal direction. A direction of an angle mode with a sequence number 18 is an upper left direction or a diagonal direction of the second quadrant 520. A direction of an angle mode with a sequence number 26 is a vertical direction. A direction (also referred to as a "first diagonal direction") of an angle mode with a sequence number 34 is an upper right direction or a diagonal direction of the first quadrant 510.

As described in connection with FIG. 4, a first range (e.g., [a1, b1]) included in the predetermined range may be between the sequence number (e.g., 26) of the angle mode in the vertical direction and the sequence number (e.g., 34) of the angle mode in the first diagonal direction, so that a1>26, b1≤34. A second range (e.g., [a2, b2]) included in the predetermined range may be between the sequence number (e.g., 10) of the angle mode in the horizontal direction and the sequence number (e.g., 2) of the angle mode in the second diagonal direction, so that a2≥2, and b2<10. In some embodiments, opposite directions of the horizontal direction, the vertical direction, and directions (i.e., directions within the second quadrant 520) between the horizontal direction and vertical direction are not possible to intersect with the at least two reference lines on the left side and the upper side of the current coding block, so that the predetermined range cannot include sequence numbers within [10, 26].

Figure 6:
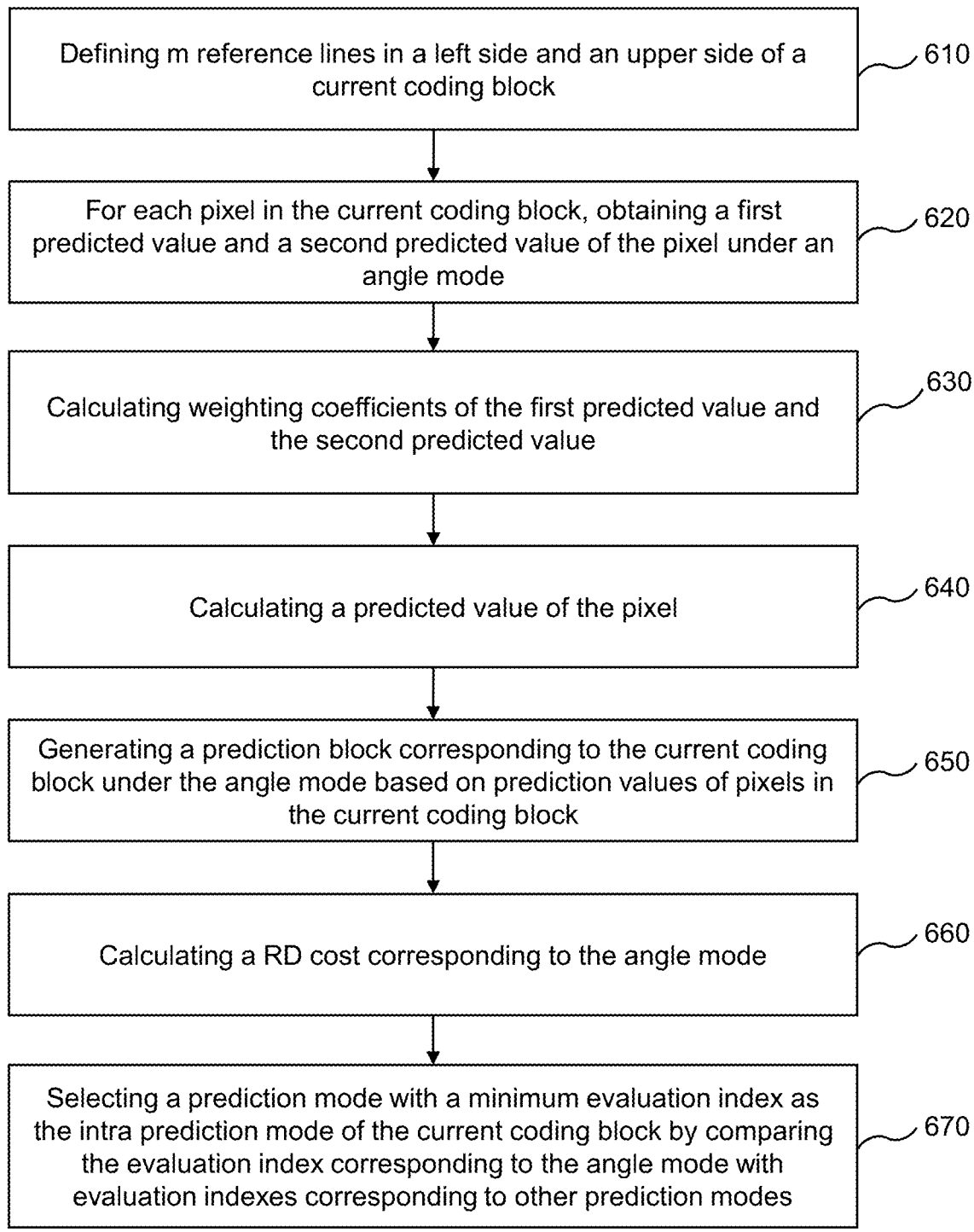
FIG. 6 is a flowchart illustrating an exemplary process for intra prediction according to some embodiments of the present disclosure.

FIG. 6 is a flowchart illustrating an exemplary process for intra prediction according to some embodiments of the present disclosure. In some embodiments, the process 600 may be implemented as a set of instructions (e.g., an application) stored in the storage ROM 230 or RAM 240. The processor 220 and/or the modules in FIG. 11 may execute the set of instructions, and when executing the instructions, the processor 220 and/or the modules may be configured to perform the process 600. The operations of the illustrated process presented below are intended to be illustrative. In some embodiments, the process 600 may be accomplished with one or more additional operations not described and/or without one or more of the operations herein discussed. Additionally, the order in which the operations of the process as illustrated in FIG. 6 and described below is not intended to be limiting.

In 610, m reference lines may be defined on each of a left side and an upper side of a current coding block. In some embodiments, m reference lines on each of the left side and the upper side of the current coding block may be defined by the processing device 112 (e.g., the first reference line determination module 1120 and the second reference line determination module 1130 illustrated in FIG. 11) (e.g., the processing circuits of the processor 220).

Figure 7:
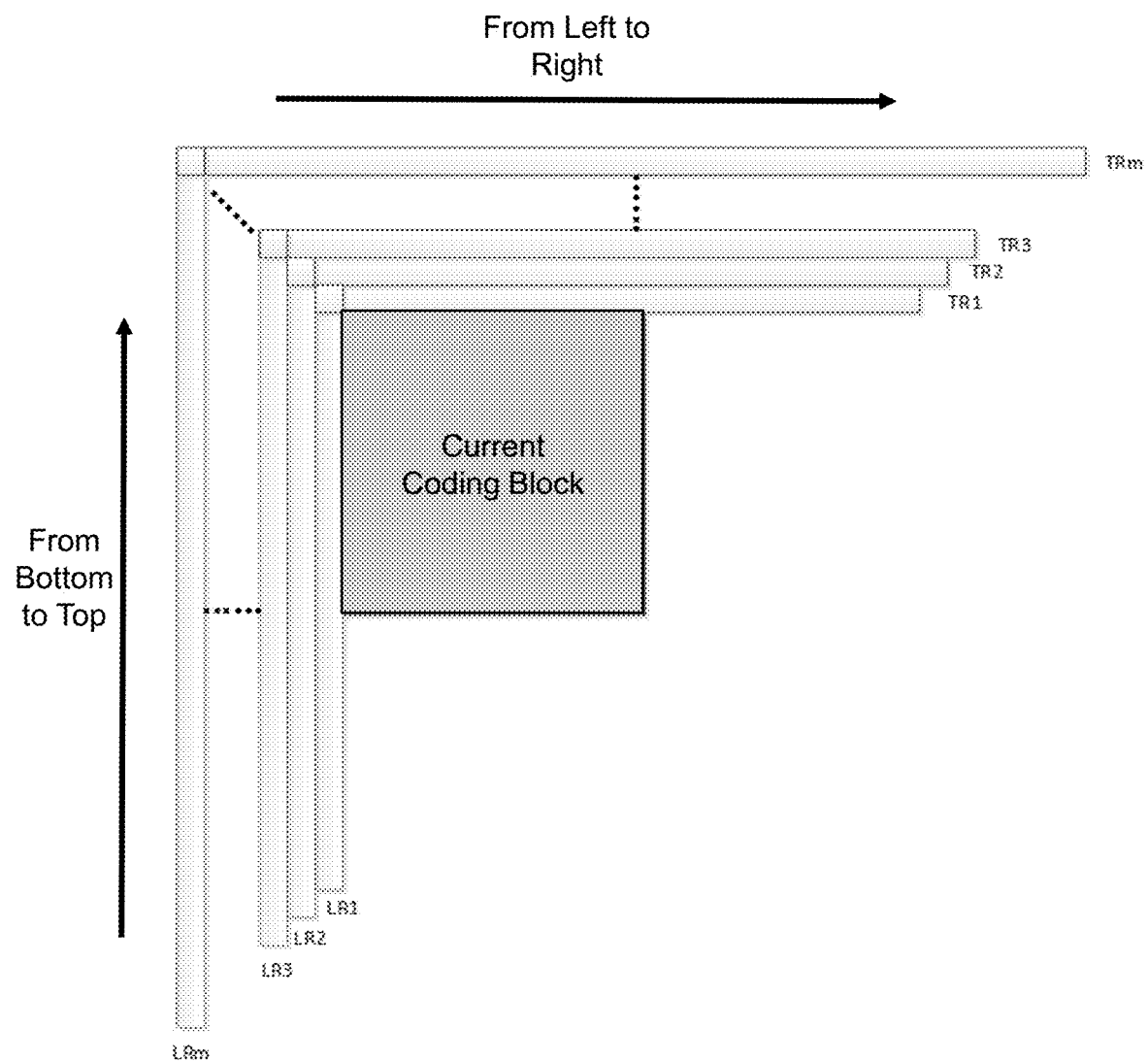
FIG. 7 is a schematic diagram illustrating exemplary reference lines associated with a current coding block according to some embodiments of the present disclosure.

In some embodiments, m may be larger than or equal to 2. In some embodiments, the m reference lines on each of the left side and the upper side of the current coding block may include m first reference lines located on the left side of the current coding block (e.g., first reference lines LR1, LR2, . . . , LRm as shown in FIG. 7) and m second reference lines located on the upper side of the current coding block (e.g., second reference lines TR1, TR2, . . . , TRm as shown in FIG. 7). As described in connection with FIG. 4, each of the m reference lines may include a plurality of reference pixels and pixel values of the plurality of reference pixels on each of the m reference lines may be determined. Further, a filtering operation may be performed on the plurality of reference pixels on one or more of the m reference lines as needed. More descriptions of the m reference lines may be found elsewhere in the present disclosure (e.g., FIG. 7 and the descriptions thereof).

In 620, for each pixel in the current coding block, a first intermediate predicted value and a second intermediate predicted value of the pixel may be obtained under an angle mode. In some embodiments, the first intermediate predicted value and the second intermediate predicted value of the pixel may be obtained by the processing device 112 (e.g., the predicted value determination module 1240 illustrated in FIG. 11) (e.g., the processing circuits of the processor 220).

As described in connection with FIG. 4, for each pixel in the current coding block, first initial predicted values and second initial predicted values of the pixel on the m reference lines may be obtained under an angle mode for intra prediction. Further, the first intermediate predicted value and the second intermediate predicted value of the pixel may be obtained by performing a weighted averaging operation on the first initial predicted values and the second initial predicted values of the pixel, respectively. In some embodiments, if weighting coefficients of initial predicted values (e.g., the first initial predicted values and the second initial predicted values) of the pixel are normalized, the weighted averaging operation may also be referred to as a weighted summation operation.

In some embodiments, the first intermediate predicted value of a pixel in the current coding block may be obtained by performing a first weighted averaging operation on the first initial predicted values according to formula (4) below:

$$\begin{cases} PT = \alpha 1*PT1 + \alpha 2*PT2 + \ldots + \alpha m*PTm \\ \alpha 1 + \alpha 2 + \ldots + \alpha m = 1 \end{cases} \quad (4)$$

where PT refers to a first intermediate predicted value of the pixel, PT1 refers to a first initial predicted value of the pixel corresponding to a 1th first reference line (e.g., the first reference line LR1 as shown in FIG. 7), PT2 refers to a first initial predicted value of the pixel corresponding to a 2th first reference line (e.g., the first reference line LR2 as shown in FIG. 7), PTm refers to a first initial predicted value of the pixel corresponding to an mth first reference line (e.g., the first reference line LRm as shown in FIG. 7), α1 refers to a weighting coefficient of the first initial predicted value PT1, α2 refers to a weighting coefficient of the first initial predicted value PT2, am refers to a weighting coefficient of the first initial predicted value PTm, m=1, 2, 3 . . . .

In some embodiments, the second intermediate predicted value of the pixel may be obtained by performing a second weighted averaging operation on the second initial predicted values according to formula (5) below:

$$\begin{cases} PL = \beta 1*PL1 + \beta 2*PL2 + \ldots + \beta m*PLm \\ \beta 1 + \beta 2 + \ldots + \beta m = 1 \end{cases} \quad (5)$$

where PL refers to a second intermediate predicted value of the pixel, PL1 refers to a second initial predicted value of the pixel corresponding to a 1th second reference line (e.g., the second reference line TR1 as shown in FIG. 7), PL2 refers to a second initial predicted value of the pixel corresponding to a 2th second reference line (e.g., the second reference line TR2 as shown in FIG. 7), PLm refers to a second initial predicted value of the pixel corresponding to a mth second reference line (e.g., the second reference line TRm as shown in FIG. 7), β1 refers to a weighting coefficient of the second initial predicted value PL1, β2 refers to a weighting coefficient of the second initial predicted value PL2, βm refers to a weighting coefficient of the second initial predicted value PLm, m=1, 2, 3 . . . .

In 630, for each pixel in the current coding block, weighting coefficients of the first intermediate predicted value and the second intermediate predicted value of the pixel may be calculated. In some embodiments, the weighting coefficients of the first intermediate predicted value and the second intermediate predicted value may be calculated by the processing device 112 (e.g., the predicted value determination module 1240 illustrated in FIG. 11) (e.g., the processing circuits of the processor 220).

In some embodiments, when a pixel in the current coding block satisfies a bidirectional prediction condition, the weighting coefficient of the second intermediate predicted value and the weighting coefficient of the first intermediate predicted value may be determined according to formula (3) illustrated in FIG. 4. In some embodiments, when the pixel does not satisfy the bidirectional prediction condition, the weighting coefficient of the first intermediate predicted value may be 1 and the weighting coefficient of the second intermediate predicted value may be 0.

In 640, for each pixel in the current coding block, a target predicted value of the pixel may be calculated based on the first intermediate predicted value and the second intermediate predicted value. In some embodiments, the target predicted value of the pixel may be calculated by the processing device 112 (e.g., the predicted value determination module 1240 illustrated in FIG. 11) (e.g., the processing circuits of the processor 220).

In some embodiments, the target predicted value of a pixel in the current coding block may be calculated according to formula (6) below:

$$P=\gamma 1*PT+\gamma 2*PL \qquad (6),$$

where P refers to the target predicted value of the pixel, γ1 refers to the weighting coefficient of the first intermediate predicted value, γ2 refers to the weighting coefficient of the second intermediate predicted value, where PT refers to the first intermediate predicted value of the pixel, PL refers to a second intermediate predicted value of the pixel.

In some embodiments, the first intermediate predicted value of a pixel in the current coding block may be first calculated and then whether the pixel satisfies the bidirectional prediction condition may be determined. If the pixel satisfies the bidirectional prediction condition, the second intermediate predicted value of the pixel and the target predicted value of the pixel may be further calculated. If the pixel does not satisfy the bidirectional prediction condition, the first intermediate predicted value of the pixel may be directly used as the target predicted value of the pixel.

In some embodiments, the target predicted value of each pixel in the current coding block may be obtained by executing operations 610-640.

In 650, a prediction block corresponding to the current coding block may be generated based on target predicted values of pixels in the current coding block generated under the angle mode. In some embodiments, the prediction block corresponding to the current coding block may be generated by the processing device 112 (e.g., the predicted coding unit determination module 1250 illustrated in FIG. 11) (e.g., the processing circuits of the processor 220).

In 660, a rate distortion (RD) cost corresponding to the angle mode may be calculated. In some embodiments, the RD cost corresponding to the angle mode may be calculated by the processing device 112 (e.g., the predicted coding unit determination module 1250 illustrated in FIG. 11) (e.g., the processing circuits of the processor 220).

In 670, a prediction mode with a minimum evaluation index may be selected as the intra prediction mode of the current coding block by comparing the evaluation index corresponding to the angle mode with evaluation indexes corresponding to other prediction modes. In some embodiments, the prediction mode with the minimum evaluation index may be selected by the processing device 112 (e.g., the predicted coding unit determination module 1250 illustrated in FIG. 11) (e.g., the processing circuits of the processor 220).

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

FIG. 7 is a schematic diagram illustrating exemplary reference lines associated with a current coding block according to some embodiments of the present disclosure. As illustrated in FIG. 7, m reference lines (e.g., LR1, LR2, LR3, . . . , LRm, TR1, TR2, TR3, . . . , TRm) may be defined on each of a left side and an upper side of a current coding block. The m reference lines on each of the left side and the upper side of the current coding block may include m first reference lines (e.g., LR1, LR2, LR3, . . . , LRm) located on the left side of the current coding block and m second reference lines (e.g., TR1, TR2, TR3, . . . , TRm) located on the upper side of the current coding block. Each of reference lines may be identified with a sequence number. The larger the sequence number of a reference line is, the greater the distance between the reference line and the current coding block may be. As described in connection with FIG. 4, each of the m reference lines on each of the left side and the upper side of the current coding block may include a plurality of reference pixels and pixel values of the plurality of reference pixels may be determined one by one along a specified direction (e.g., from bottom to top, from left to right).

Figure 8:
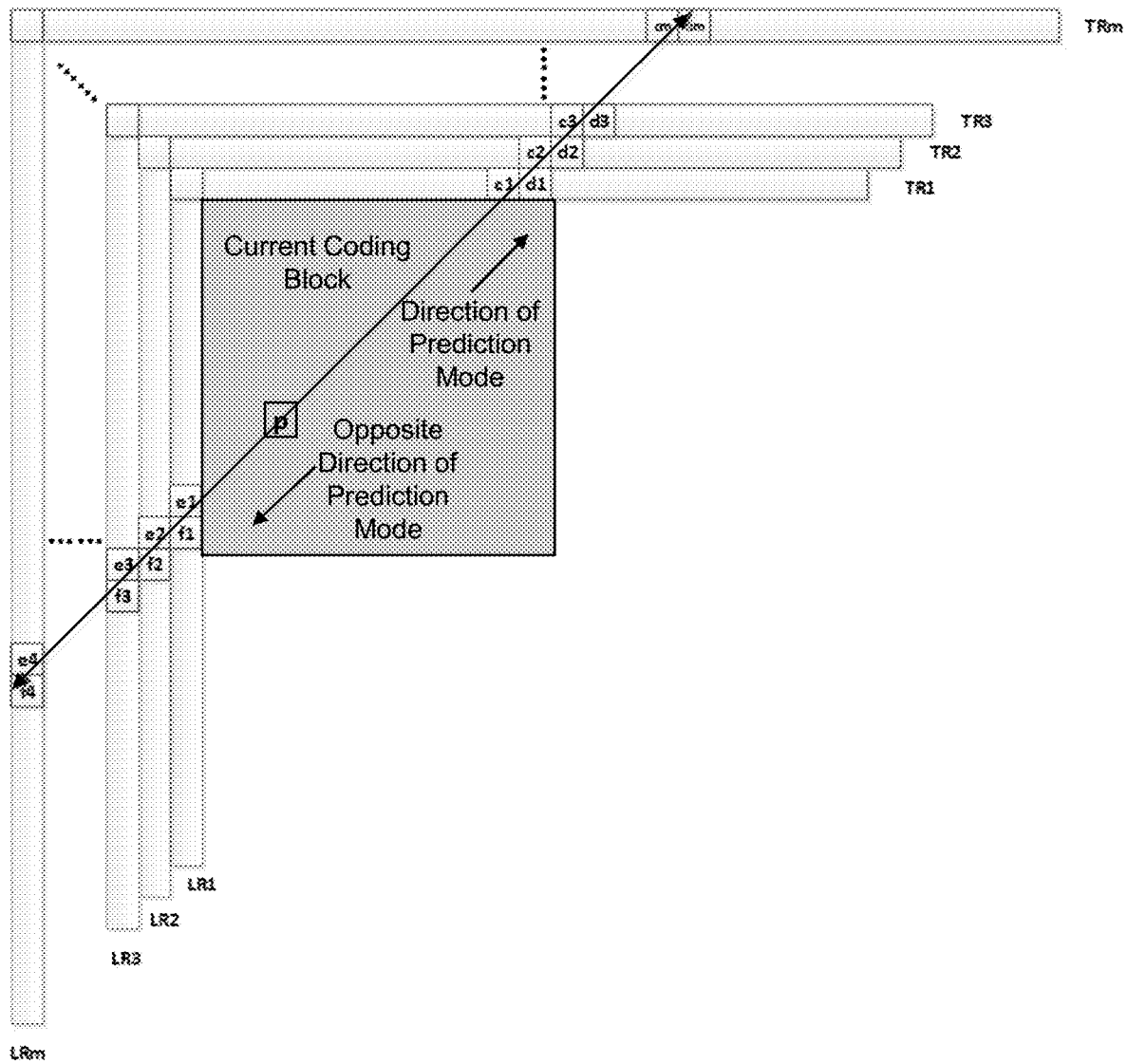
FIG. 8 is a schematic diagram illustrating exemplary operations for determining an initial predicted value of a pixel under an angle mode according to some embodiments of the present disclosure.

FIG. 8 is a schematic diagram illustrating exemplary operations for determining an initial predicted value of a pixel under an angle mode according to some embodiments of the present disclosure. As illustrated in FIG. 8, taking a specific pixel p in the current coding block as an example, a line starting from a location of the pixel p intersects with m second reference lines, i.e., TR1, TR2, TR3, . . . , TRm in the upper side of the current coding block along a direction of a prediction mode and m first reference lines, i.e., LR1, LR2, LR3, . . . , LRm located on the left side of the current coding block along another direction opposite to the direction of the prediction mode. For each of the m second reference lines, if an intersection (i.e., a first projection location) of the line and the second reference line locates at a reference pixel on the second reference line, the pixel value of the reference pixel may be directly designated as a first initial predicted value of the pixel p on the second reference line. If the intersection of the line and the second reference line locates between two adjacent reference pixels (e.g., reference pixels c1 and d1, c2 and d2, c3 and d3, cm and dm) on the second reference line, an interpolation result of the two adjacent reference pixels may be calculated as the first initial predicted value of the pixel p on the second reference line according to the formula (2) illustrated in FIG. 4.

A line starting from the location of the pixel p intersects with m first reference lines, i.e., LR1, LR2, LR3, . . . , LRm in the left side of the current coding block along an opposite direction of the prediction mode. For each of the m first reference lines, if an intersection (i.e., a second projection location) of the line and the first reference line locates at a reference pixel on the first reference line, the pixel value of the reference pixel may be directly designated as a second initial predicted value of the pixel p on the first reference line. If the intersection of the line and the first reference line locates between two adjacent reference pixels (e.g., e1 and f1, e2 and f2, e3 and f3, em and fm) on the first reference line, an interpolation result of the two adjacent reference pixels may be calculated as the second initial predicted value of the pixel p on the first reference line according to the formula (2) illustrated in FIG. 4.

Figure 9:
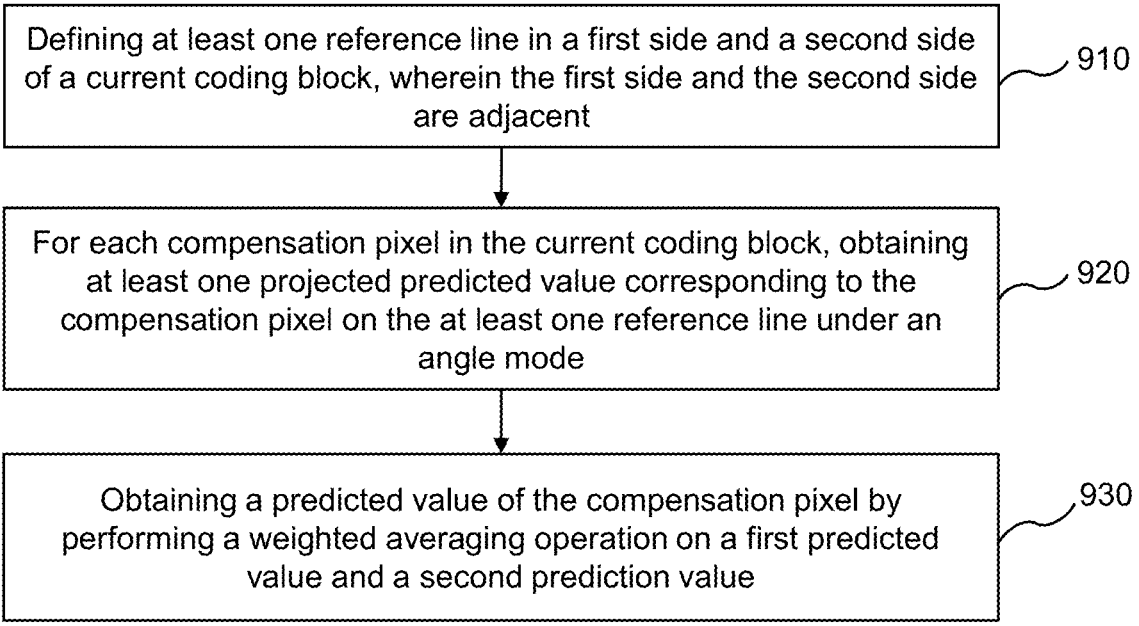
FIG. 9 is a flowchart illustrating an exemplary process for intra prediction according to some embodiments of the present disclosure.

FIG. 9 is a flowchart illustrating an exemplary process for intra prediction according to some embodiments of the present disclosure. In some embodiments, the process 900 may be implemented as a set of instructions (e.g., an application) stored in the storage ROM 230 or RAM 240. The processor 220 and/or the modules in FIG. 11 may execute the set of instructions, and when executing the instructions, the processor 220 and/or the modules may be configured to perform the process 900. The operations of the illustrated process presented below are intended to be illustrative. In some embodiments, the process 900 may be accomplished with one or more additional operations not described and/or without one or more of the operations herein discussed. Additionally, the order in which the operations of the process as illustrated in FIG. 9 and described below is not intended to be limiting.

In 910, at least one reference line may be defined on each of a first side and a second side of a current coding block, wherein the first side and the second side are adjacent. In some embodiments, the at least one reference line may be defined by the processing device 112 (e.g., the first reference line determination module 1120 and the second reference line determination module 1130 illustrated in FIG. 11) (e.g., the processing circuits of the processor 220).

As used herein, "coding block" may also be referred to as a "coding unit (CU)." The current coding block may also be referred to as a current block. In some embodiments, the current coding block may refer to a block to be encoded in an image and the current coding block may include a plurality of pixels. The first side and the second side of the current coding block may be physically adjacent rather than parallel to each other. For example, if the first side is the left side of the current coding block, the second side may be the upper side or a lower side of the current coding block, not a right side of the current coding block. In some embodiments, since a reference line needs to include as many encoded pixels as possible, the first side and/or the second side of the current coding block may be determined based on an order of coding/decoding the image (e.g., a frame of a video). For example, if the order of coding/decoding the image is from the left to the right and from the top to the bottom, the first side may be the left side of the current coding block and the second side may be the upper side of the current coding block or the first side may be the upper side of the current coding block and the second side may be the left side of the current coding block.

In some embodiments, the at least one reference line on each of the first side and the second side of the current coding block may include at least one first reference line located on the left side of the current coding block and at least one second reference line located on the upper side of the current coding block. In some embodiments, when a count (or number) of reference lines is larger than 1, in order to reduce the storage space of reference pixels on the reference lines, a count of reference pixels on each of one or more other first reference lines may be calculated based on a count of reference pixels on a first reference line closest to the current coding block according to the formula (1) illustrated in FIG. 4. Further, a count of reference pixels on each of one or more other second reference lines may be calculated based on a count of reference pixels on a second reference line closest to the current coding block according to the formula (1) illustrated in FIG. 4.

In some embodiments, as described in connection with FIG. 4, each of the at least one reference line on each of the first side and the second side of the current coding block may include a plurality of reference pixels. For each of the plurality of reference pixels, a pixel value of the reference pixel may be determined before the subsequent operations are executed. Further, after pixel values of the plurality of reference pixels on each of the at least one reference line on each of the first side and the second side of the current coding block are determined, whether a filtering operation needs to be performed on the plurality of reference pixels on a reference line may be determined.

In 920, for each compensation pixel in the current coding block, at least one initial predicted value of the compensation pixel on the at least one reference line on each of the first side and the second side of the current coding block may be obtained under an angle mode. In some embodiments, the at least one initial predicted value of the compensation pixel may be obtained by the processing device 112 (e.g., the predicted value determination module 1140 illustrated in FIG. 11) (e.g., the processing circuits of the processor 220).

In some embodiments, a pixel that satisfies a bidirectional prediction condition may be referred to as a compensation pixel and a pixel that does not satisfy the bidirectional prediction condition may be referred to as a non-compensation pixel. For each compensation pixel in the current coding block, the at least one initial predicted value of the compensation pixel may include at least one first initial predicted value in a direction of the angle mode and at least one second initial predicted value in an opposite direction of the angle mode. In some embodiments, the at least one first initial predicted value and the at least one second initial predicted value may be calculated according to the description in FIG. 4 and in FIG. 8.

In some embodiments, the bidirectional prediction condition may include that a sequence number of the angle mode is within a predetermined range and the pixel is within a compensation region. The compensation region may be set according to actual needs. A size of the compensation region cannot be larger than a size of the current block, and each of pixels in the compensation region may have a second projection location.

In some embodiments, the predetermined range may include a first range and/or a second range. The first range may be between a sequence number of an angle mode in a vertical direction and a sequence number of an angle mode in a first diagonal direction and may not include the sequence number of the angle mode in the vertical direction. The second range may be between a sequence number of an angle mode in a horizontal direction and a sequence number of an angle mode in a second diagonal direction and may not include the sequence number of the angle mode in the horizontal direction. An angle between the first diagonal direction and the vertical direction may be 45° and an angle between the second diagonal direction and the horizontal direction is 45°. Both the first diagonal direction and the second diagonal direction may be not between the vertical direction and the horizontal direction. More descriptions of the predetermined range may be found elsewhere in the present disclosure (e.g., FIG. 5 and the descriptions thereof).

In 930, a target predicted value of the compensation pixel may be obtained by performing a weighted averaging operation on a first intermediate predicted value and a second intermediate predicted value. In some embodiments, the target predicted value of the compensation pixel may be obtained by the processing device 112 (e.g., the predicted value determination module 1140 illustrated in FIG. 11) (e.g., the processing circuits of the processor 220).

In some embodiments, for each compensation pixel in the current coding block, it is assumed that a first projection location and a second projection location corresponding to the compensation pixel may be found on each reference line and a first initial predicted value and a second initial predicted value of the compensation pixel on each reference line may be obtained. A count of one or more first initial predicted values of the compensation pixel and a count of one or more second initial predicted values of the compensation pixel may be equal to a count of reference lines in a single side of the current coding block.

In some embodiments, for each compensation pixel in the current coding block, the first intermediate predicted value of the compensation pixel may be obtained based on one or more first initial predicted values and the second intermediate predicted value of the compensation pixel may be obtained based on one or more second initial predicted values. Specifically, when the count of the one or more first initial predicted values is 1, the first intermediate predicted value may be equal to the single one first initial predicted value or the first initial predicted value may be used as the first intermediate predicted value. When the count of the one or more first initial predicted values is larger than 1, the first intermediate predicted value may be a weighted average of all the one or more first initial predicted values. When the count of the one or more second initial predicted values is 1, the second intermediate predicted value may be equal to the single one second initial predicted value or the second initial predicted value may be used as the second intermediate predicted value. When the count of the one or more second initial predicted values is larger than 1, the second intermediate predicted value may be a weighted average of all the one or more second initial predicted values.

In some embodiments, for each pixel in the current coding block, the target predicted value of the pixel may be further obtained by performing a third weighted averaging operation on the first intermediate predicted value and the second intermediate predicted value. In the third weighted averaging operation, a weighting coefficient of the first intermediate predicted value may be negatively related to a first distance between the compensation pixel and a projection location corresponding to a first initial predicted value. A weighting coefficient of the second intermediate predicted value may be negatively related to a second distance between the compensation pixel and a projection location corresponding to a second initial predicted value. The weighting coefficient of the second intermediate predicted value and the weighting coefficient of the first intermediate predicted value may be determined according to formula (3) illustrated in FIG. 4.

In the above embodiments, the weighting coefficient of the second intermediate predicted value and the weighting coefficient of the first intermediate predicted value are determined based on the first distance and the second distance, which improves the accuracy of the determined weighting coefficient and the accuracy of the target predicted value of the compensation pixel, thereby improving the effect of reducing the spatial redundancy of the current coding block.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 10:
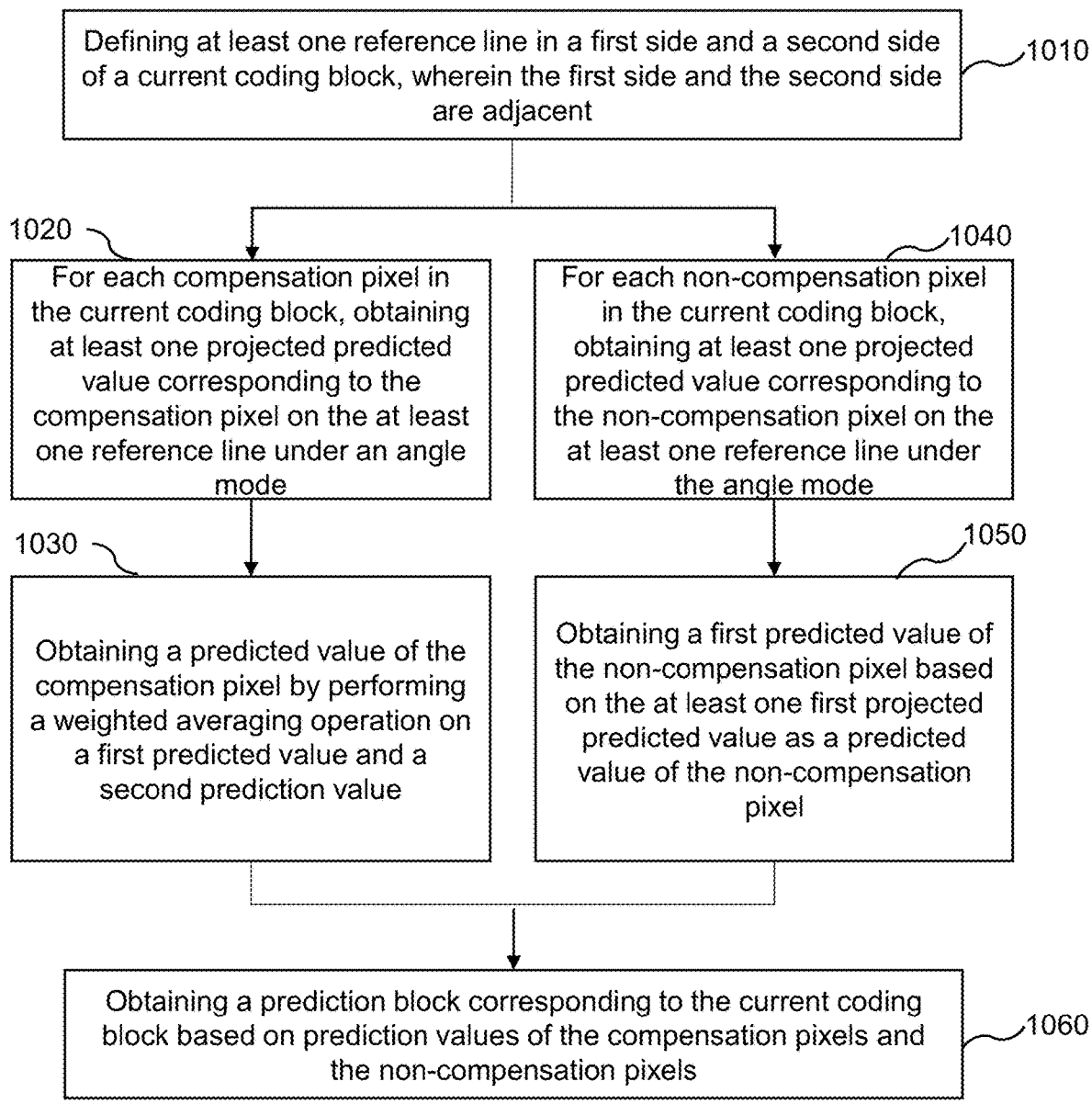
FIG. 10 is a flowchart illustrating an exemplary process for intra prediction according to some embodiments of the present disclosure.

FIG. 10 is a flowchart illustrating an exemplary process for intra prediction according to some embodiments of the present disclosure. In some embodiments, the process 1000 may be implemented as a set of instructions (e.g., an application) stored in the storage ROM 230 or RAM 240. The processor 220 and/or the modules in FIG. 11 may execute the set of instructions, and when executing the instructions, the processor 220 and/or the modules may be configured to perform the process 1000. The operations of the illustrated process presented below are intended to be illustrative. In some embodiments, the process 1000 may be accomplished with one or more additional operations not described and/or without one or more of the operations herein discussed. Additionally, the order in which the operations of the process as illustrated in FIG. 10 and described below is not intended to be limiting.

In 1010, at least one reference line may be defined on each of a first side and a second side of a current coding block, wherein the first side and the second side are adjacent. In some embodiments, the at least one reference line may be defined by the processing device 112 (e.g., the first reference line determination module 1120 and the second reference line determination module 1130 illustrated in FIG. 11) (e.g., the processing circuits of the processor 220).

In 1020, for each compensation pixel in the current coding block, at least one initial predicted value of the compensation pixel may be obtained under an angle mode on the at least one reference line. In some embodiments, the at least one initial predicted value corresponding to the compensation pixel may be obtained by the processing device 112 (e.g., the predicted value determination module 1140 illustrated in FIG. 11) (e.g., the processing circuits of the processor 220). As described in connection with FIG. 9, the at least one initial predicted value corresponding to the compensation pixel may include at least one first initial predicted value in a direction of the angle mode and at least one second initial predicted value in an opposite direction of the angle mode.

In 1030, a target predicted value of the compensation pixel may be obtained under the angle mode by performing a weighted averaging operation on a first intermediate predicted value and a second intermediate predicted value. In some embodiments, the target predicted value of the compensation pixel may be obtained by the processing device 112 (e.g., the predicted value determination module 1140 illustrated in FIG. 11) (e.g., the processing circuits of the processor 220). As described in connection with FIG. 9, the first intermediate predicted value may be obtained based on the at least one first initial predicted value and the second intermediate predicted value may be obtained based on the at least one second initial predicted value.

In 1040, for each non-compensation pixel in the current coding block, at least one initial predicted value of the non-compensation pixel may be obtained under the angle mode on the at least one reference line. In some embodiments, the at least one initial predicted value corresponding to the non-compensation pixel may be obtained by the processing device 112 (e.g., the predicted value determination module 1140 illustrated in FIG. 11) (e.g., the processing circuits of the processor 220). In some embodiments, the at least one initial predicted value of the non-compensation pixel may include the at least one first initial predicted value in the direction of the angle mode.

In 1050, a first intermediate predicted value of the non-compensation pixel may be obtained under an angle mode based on the at least one first initial predicted value as a target predicted value of the non-compensation pixel. In some embodiments, the first intermediate predicted value of the non-compensation pixel may be obtained by the processing device 112 (e.g., the predicted value determination module 1140 illustrated in FIG. 11) (e.g., the processing circuits of the processor 220). In some embodiments, when the count of the at least one first initial predicted values is 1, the first intermediate predicted value may be equal to the single one first initial predicted value or the first initial predicted value may be used as the single one first intermediate predicted value. When the count of the at least one first initial predicted values is larger than 1, the first intermediate predicted value may be a weighted average of all the at least one first initial predicted values.

In this embodiment, the execution order of the process (e.g., 1020-1030) for obtaining the target predicted value of the compensation pixel and the process (e.g., 1040-1050) for obtaining the target predicted value of the non-compensation pixel is not intended to be limited.

In 1060, a prediction block corresponding to the current coding block may be obtained based on target predicted values of the compensation pixels and the non-compensation pixels. In some embodiments, the prediction block corresponding to the current coding block may be obtained by the processing device 112 (e.g., the predicted coding unit determination module 1150 illustrated in FIG. 11) (e.g., the processing circuits of the processor 220).

A count of pixels of the prediction block corresponding to the current coding block may be the same as a count of pixels of the current coding block and a pixel value of each pixel in the prediction block may be the target predicted value of the pixel in the current coding block.

In some embodiments, an evaluation index (e.g., a rate-distortion (RD) cost) of an intra compression effect corresponding to the angle mode may be calculated based on the current coding block and the prediction block under the angle mode corresponding to the current coding block. Further, a prediction mode with a minimum evaluation index may be selected as the intra prediction mode of the current coding block by comparing the evaluation index corresponding to the angle mode with evaluation indexes corresponding to other prediction modes.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 11:
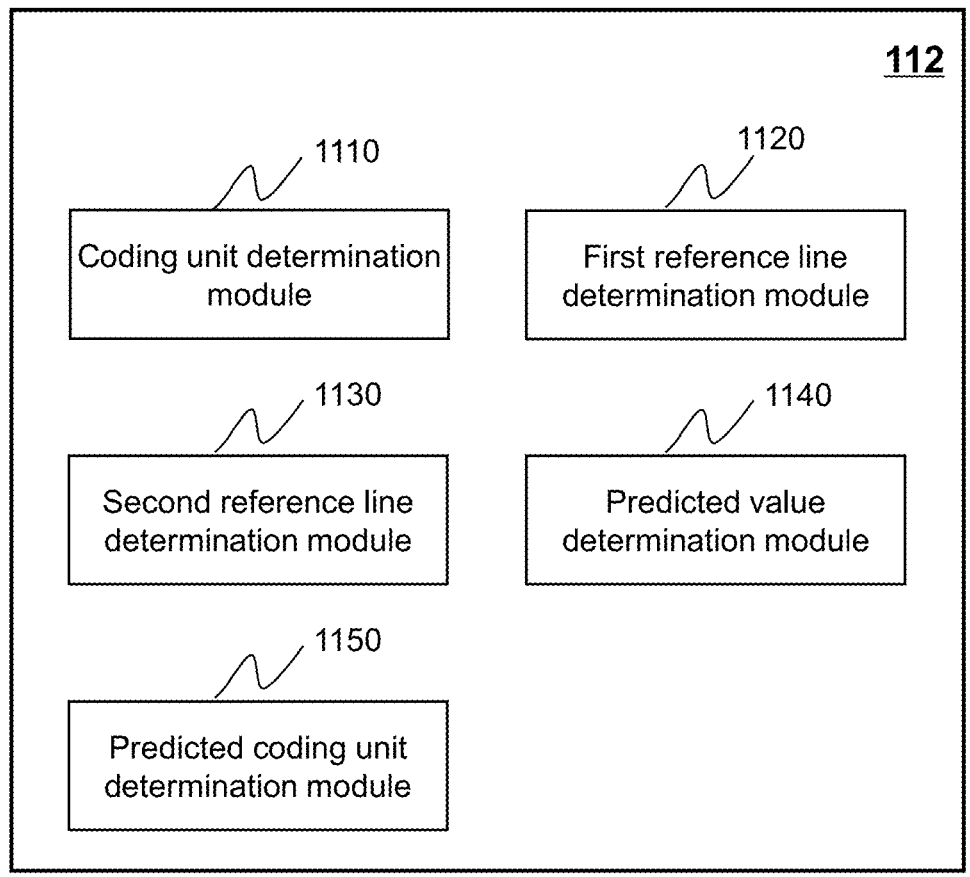
FIG. 11 is a block diagram illustrating an exemplary processing device according to some embodiments of the present disclosure.

FIG. 11 is a block diagram illustrating an exemplary processing device according to some embodiments of the present disclosure. The processing device 112 may include a coding unit determination module 1110, a first reference line determination module 1120, a second reference line determination module 1130, a predicted value determination module 1140, and a predicted coding unit determination module 1150.

The coding unit determination module 1110 may be configured to determine a coding unit in an image, the coding unit including a plurality of pixels.

The first reference line determination module 1120 may be configured to determine a plurality of first reference lines associated with the coding unit, the plurality of first reference lines being along a first side (e.g., a left side) of the coding unit.

The second reference line determination module 1130 may be configured to determine a plurality of second reference lines associated with the coding unit, the plurality of second reference lines being along a second side (e.g., an upper side) of the coding unit.

The predicted value determination module 1140 may be configured to, for each of the plurality of pixels in the coding unit, determine a target predicted value of the pixel based on at least one of the plurality of first reference lines and/or the plurality of second reference lines according to the prediction mode.

In some embodiments, when the prediction mode is the angle prediction mode, the predicted value determination module 1140 may determine whether the prediction mode satisfies a prediction condition. In response to determining that the prediction mode satisfies the prediction condition, for each of the plurality of pixels in the coding unit, the predicted value determination module 1140 may determine a first intermediate predicted value of the pixel based on at least one of the plurality of first reference lines and a second intermediate predicted value of the pixel based on at least one of the plurality of second reference lines. Further, the predicted value determination module 1140 may determine the target predicted value of the pixel based on the first intermediate predicted value and the second intermediate predicted value. In response to determining that the prediction mode does not satisfy the prediction condition, the predicted value determination module 1140 may determine the target predicted value of the pixel based on the first intermediate predicted value or the second intermediate predicted value.

The predicted coding unit determination module 1150 may be configured to determine a predicted coding unit corresponding to the coding unit based on a plurality of target predicted values of the plurality of pixels in the coding unit.

In some embodiments, the predicted coding unit determination module 1150 may determine a plurality of prediction coding units corresponding to the coding unit based on a plurality of prediction modes. For each of the plurality of prediction coding units, the predicted coding unit determination module 1150 may determine a rate-distortion (RD) cost corresponding to one of the plurality of prediction modes by performing a rate-distortion optimization (RDO) on the prediction coding unit. Further, the predicted coding unit determination module 1150 may select an optimal prediction mode with a minimum RD cost from the plurality of prediction modes.

The modules in the processing device 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units.

For example, the first reference line determination module 1120 and the second reference line determination module 1130 may be combined as a single module which may both determine the plurality of first reference lines and the plurality of second reference lines associated with the coding unit. As another example, the processing device 112 may also include a transmission module configured to transmit signals (e.g., electrical signals, electromagnetic signals) to one or more components (e.g., the acquisition device 130) of the image coding system 100. As a further example, the processing device 112 may include a storage module (not shown) used to store information and/or data (e.g., the coding unit, the prediction mode, the predicted coding unit corresponding to the coding unit) associated with the image coding.

Figure 12:
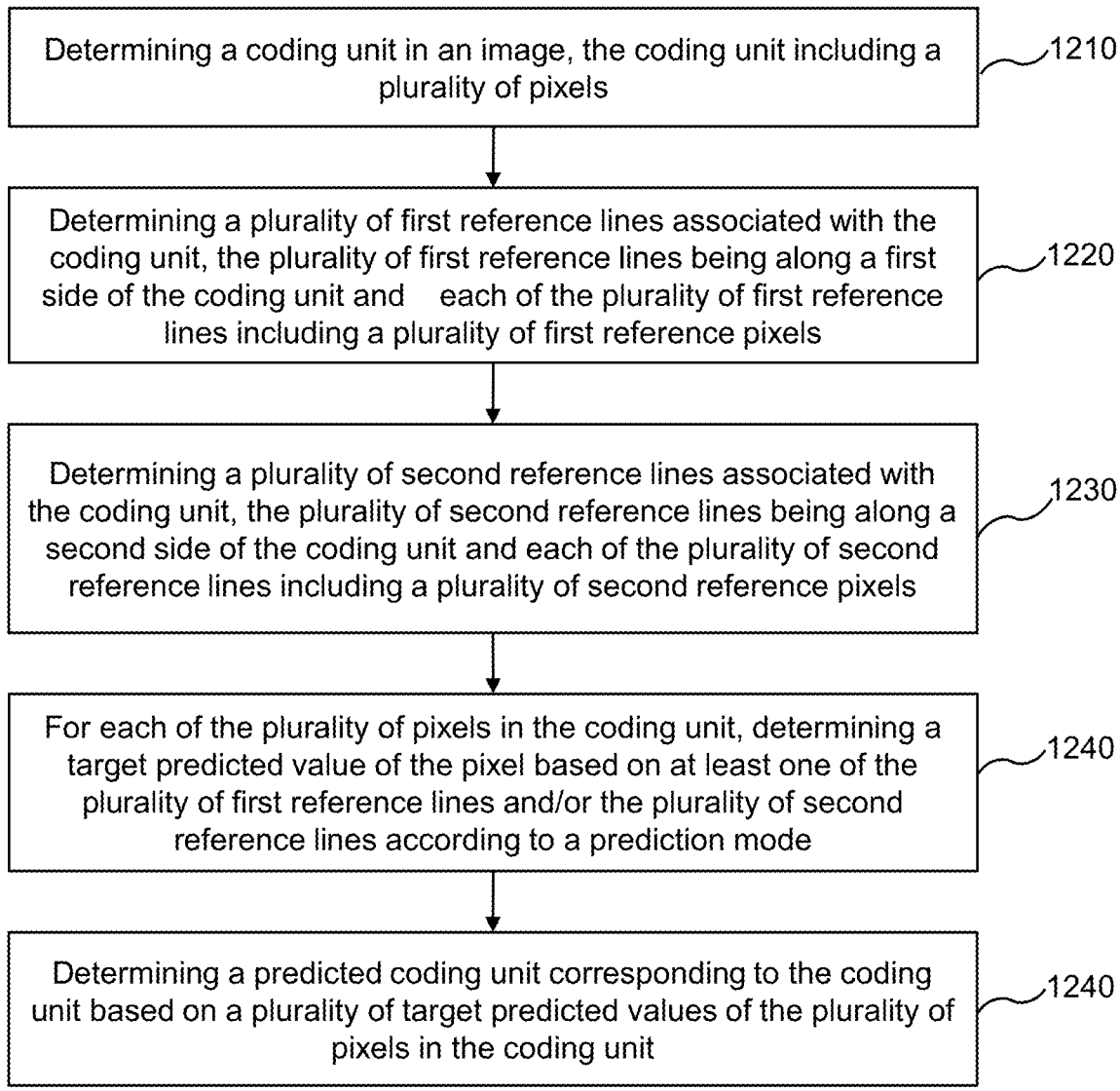
FIG. 12 is a flowchart illustrating an exemplary process for image coding according to some embodiments of the present disclosure.

FIG. 12 is a flowchart illustrating an exemplary process for image coding according to some embodiments of the present disclosure. In some embodiments, the process 1200 may be implemented as a set of instructions (e.g., an application) stored in the storage ROM 230 or RAM 240. The processor 220 and/or the modules in FIG. 11 may execute the set of instructions, and when executing the instructions, the processor 220 and/or the modules may be configured to perform the process 1200. The operations of the illustrated process presented below are intended to be illustrative. In some embodiments, the process 1200 may be accomplished with one or more additional operations not described and/or without one or more of the operations herein discussed. Additionally, the order in which the operations of the process as illustrated in FIG. 12 and described below is not intended to be limiting.

In 1210, the processing device 112 (e.g., the coding unit determination module 1110) (e.g., the processing circuits of the processor 220) may determine a coding unit in an image, the coding unit including a plurality of pixels.

In some embodiments, the processing device 112 may obtain the image from the acquisition device 130 and extract the coding unit from the image. In some embodiments, the coding unit may be a quadrilateral region (e.g., a square) with a size in the image. As used herein, the size may include 2 pixels*2 pixels, 4 pixels*4 pixels, 8 pixels*8 pixels, 16 pixels*16 pixels, 32 pixels*32 pixels, 64 pixels*64 pixels, 128 pixels*128 pixels, etc. In some embodiments, the image may be a frame in a video collected by the acquisition device 130 (e.g., the camera 130-1, the video recorder 130-2, the sensor 130-3, etc.). The processing device 112 may determine the image (i.e., the frame) from the video. For example, the processing device 112 may perform a framing operation on the video to obtain a plurality of frames in the video. The processing device 112 may obtain one of the plurality of frames as the image.

In 1220, the processing device 112 (e.g., the first reference line determination module 1120) (e.g., the processing circuits or the processing circuits of the processor 220) may determine a plurality of first reference lines associated with the coding unit, the plurality of first reference lines being along a first side (e.g., a left side) of the coding unit. As used herein, a side of a coding unit may refer to a region beside a boundary of the coding unit. For example, the first side of the coding unit may refer to a first region beside a first boundary (e.g., left boundary) of the coding unit. The direction of each of the plurality of first reference lines may be parallel to the first boundary of the coding unit. The plurality of first reference lines may be distributed on the first side of the coding unit one by one along a direction away from the first boundary of the coding unit. Each of the plurality of first reference lines may include a plurality of first reference pixels. The count of the plurality of first reference pixels on each of at least two of the plurality of first reference lines may be the same or different. In other words, the length of each of at least two of the plurality of first reference lines may be the same or different. In some embodiments, the processing device 112 may determine a count of a plurality of first reference pixels on a first reference line closest to the coding unit (e.g., closest to the first side of the coding unit or a center of the coding unit) based on a count of pixels in the coding unit along the first side of the coding unit. As used herein, pixels in the coding unit along the first side of the coding unit may refer to pixels in one single column or row of the coding unit that along the direction of the first boundary of the coding. For example, the count of the plurality of first reference pixels on the first reference line closest to the coding unit may be twice the count of pixels in the coding unit along the first side of the coding unit. As described in connection with FIG. 4, the processing device 112 may determine a count of a plurality of first reference pixels on another first reference line based on the count of the plurality of first reference pixels on the first reference line closest to the coding unit according to formula (1). Further, as described in connection with FIG. 4, for each of the plurality of first reference pixels in the each of the plurality of first reference lines, the processing device 112 may determine a pixel value of the pixel.

In 1230, the processing device 112 (e.g., the second reference line determination module 1130) (e.g., the processing circuits of the processor 220) may determine a plurality of second reference lines associated with the coding unit, the plurality of second reference lines being along a second side (e.g., an upper side) of the coding unit.

In some embodiments, the direction of each of the plurality of second reference lines may be parallel to the second boundary of the coding unit. The plurality of second reference lines may be distributed on the second side of the coding unit one by one along a direction away from the second boundary of the coding unit. Each of the plurality of second reference lines may include a plurality of second reference pixels. The count of the plurality of second reference pixels on each of at least two of the plurality of second reference lines may be the same or different. In other words, the length of each of at least two of the plurality of second reference lines may be the same or different. In some embodiments, the processing device 112 may determine a count of a plurality of second reference pixels on a second reference line closest to the coding unit (e.g., closest to the second side of the coding unit or a center of the coding unit) based on a count of pixels in the coding unit along the second side of the coding unit. As used herein, pixels in the coding unit along the second side of the coding unit may refer to pixels in one single column or row of the coding unit that along the direction of the second boundary of the coding. For example, the count of the plurality of second reference pixels on the second reference line closest to the coding unit may be twice the count of pixels in the coding unit along the second side of the coding unit. As described in connection with FIG. 4, the processing device 112 may determine a count of a plurality of second reference pixels on another second reference line based on the count of the plurality of second reference pixels on the second reference line closest to the coding unit according to formula (1). Further, as described in connection with FIG. 4, for each of the plurality of second reference pixels in the each of the plurality of second reference lines, the processing device 112 may determine a pixel value of the pixel.

The first side and the second side may be two adjacent sides of the coding unit. For example, if the first side is the upper side of the coding unit, the second side may be the left side or the right side of the coding unit. As another example, if the first side is the left side of the coding unit, the second side may be the upper side or the bottom side of the coding unit. In some embodiments, the first side and/or the second side of the coding unit may be determined based on an order of coding/decoding the image (e.g., a frame of a video). For example, if the order of coding/decoding the image is from the left to the right of the image and from the top to the bottom of the image, the first side may be the left side of the coding unit and the second side may be the upper side of the coding unit or the first side may be the upper side of the coding unit and the second side may be the left side of the coding unit.

In some embodiments, as described in connection with FIG. 4, the processing device 112 may determine whether a filtering operation (e.g., a smoothing filtering operation) needs to be performed on the plurality of first reference pixels of each of at least a portion of the plurality of first reference lines and/or the plurality of second reference pixels of each of at least a portion of the plurality of second reference lines. In some embodiments, the processing device 112 may determine whether the filtering operation (e.g., a smoothing filtering operation) needs to be performed based on the size of the coding unit. For example, the processing device 112 may determine whether the size of the coding unit exceeds a size threshold. In some embodiments, the size threshold may be a default setting (e.g., 2 pixels*2 pixels) of the image coding system 100 or may be adjustable under different situations. In response to determining that size of the coding unit is higher than the size threshold, the processing device 112 may perform a filtering operation on the plurality of first reference pixels of each of the at least a portion of the plurality of first reference lines and/or the plurality of second reference pixels of each of the at least a portion of the plurality of second reference lines. In some embodiments, the processing device 112 may determine whether the filtering operation (e.g., a smoothing filtering operation) needs to be performed based on a prediction mode used for intra prediction of the image. The prediction mode may include a DC prediction mode, a planar prediction mode, an angle prediction mode, etc. For example, the processing device 112 may determine whether the prediction mode used for intra prediction of the image satisfies the filtering condition (e.g., the prediction mode is not a DC prediction mode). In response to determining that the prediction mode satisfies the filtering condition, the processing device 112 may perform the filtering operation on the plurality of first reference pixels of each of the at least a portion of the plurality of first reference lines and/or the plurality of second reference pixels of each of the at least a portion of the plurality of second reference lines. In some embodiments, the processing device 112 may determine that the prediction mode satisfies the filtering condition if the prediction mode is not the DC prediction mode.

In 1240, for each of the plurality of pixels in the coding unit, the processing device 112 (e.g., the predicted value determination module 1140) (e.g., the processing circuits of the processor 220) may determine a target predicted value of the pixel based on at least one of the plurality of first reference lines and/or the plurality of second reference lines according to the prediction mode.

In some embodiments, when the prediction mode is the angle prediction mode, the processing device 112 may determine whether the prediction mode satisfies a prediction condition. In response to determining that the prediction mode satisfies the prediction condition, for each of the plurality of pixels in the coding unit, the processing device 112 may determine a first intermediate predicted value of the pixel based on at least one of the plurality of first reference lines and a second intermediate predicted value of the pixel based on at least one of the plurality of second reference lines. The first intermediate predicted value may be associated with at least one projection location of the pixel on the at least one of the plurality of first reference lines or the at least one of the plurality of second reference lines along a direction of the prediction mode corresponding to the pixel. The second intermediate predicted value may be associated with at least one projection location on the at least one of the plurality of first reference lines or the at least one of the plurality of second reference lines along an opposite direction of the prediction mode corresponding to the pixel. Further, the processing device 112 may determine the target predicted value of the pixel based on the first intermediate predicted value and the second intermediate predicted value. In response to determining that the prediction mode does not satisfy the prediction condition, the processing device 112 may determine the target predicted value of the pixel based on the first intermediate predicted value or the second intermediate predicted value. More descriptions of determining the first intermediate predicted value, the second intermediate predicted value, and/or the target predicted value of the pixel when the prediction mode is the angle prediction mode may be found elsewhere in the present disclosure (e.g., FIG. 13 and the descriptions thereof).

In some embodiments, when the prediction mode is the DC prediction mode, for each of the plurality of pixels in the coding unit, the processing device 112 may determine the target predicted value of the pixel based on the first intermediate predicted value and the second intermediate predicted value. More descriptions of determining the first intermediate predicted value, the second intermediate predicted value, and/or the target predicted value of the pixel when the prediction mode is the DC prediction mode may be found elsewhere in the present disclosure (e.g., FIG. 14 and the descriptions thereof).

In some embodiments, when the target prediction mode is the planar prediction mode, for each of the plurality of pixels in the coding unit, the processing device 112 may determine the target predicted value of the pixel based on the first intermediate predicted value and the second intermediate predicted value. More descriptions of determining the first intermediate predicted value, the second intermediate predicted value, and/or the target predicted value of the pixel when the prediction mode is the planar prediction mode may be found elsewhere in the present disclosure (e.g., FIG. 15 and the descriptions thereof).

In some embodiments, for each of the plurality of pixels in the coding unit, the processing device 112 may determine a preliminary predicted value (e.g., the first intermediate predicted value) of the pixel based on at least one of the plurality of first reference lines. Further, the processing device 112 may determine whether the prediction mode satisfies the prediction condition. In response to determining that the prediction mode satisfies the prediction condition, the processing device 112 may determine whether the pixel is within a compensation region. In some embodiments, the processing device 112 may determine the compensation region based on the prediction mode and the size of the coding unit. In response to determining that the pixel is within the compensation region, the processing device 112 may determine a compensation value (e.g., the second intermediate predicted value) of the pixel based on at least one of the plurality of second reference lines. According to the compensation value of the pixel, the processing device 112 may determine the target predicted value of the pixel by performing a compensation operation on the preliminary predicted value of the pixel. In response to determining that the prediction mode does not satisfy the prediction condition or the pixel is not within the compensation region, the processing device 112 may designate the preliminary predicted value of the pixel as the target predicted value of the pixel. More descriptions of the compensation operation may be found elsewhere in the present disclosure (e.g., FIG. 16 and the descriptions thereof).

In 1250, the processing device 112 (e.g., the predicted coding unit determination module 1150) (e.g., the processing circuits of the processor 220) may determine a predicted coding unit corresponding to the coding unit based on a plurality of target predicted values of the plurality of pixels in the coding unit.

In some embodiments, the processing device 112 may determine a plurality of prediction coding units corresponding to the coding unit based on a plurality of prediction modes. For example, the processing device 112 may determine the plurality of prediction coding units corresponding to the coding unit based on multiple angle modes with different angles. Each of the plurality of prediction coding units may be determined based on one of the plurality of prediction modes. For each of the plurality of prediction coding units, the processing device 112 may determine a rate-distortion (RD) cost corresponding to one of the plurality of prediction modes by performing a rate-distortion optimization (RDO) on the prediction coding unit. Further, the processing device 112 may select an optimal prediction mode with a minimum RD cost from the plurality of prediction modes.

In some embodiments, the processing device 112 may generate a coded image corresponding to the image based on prediction coding units corresponding to coding units in the image and further transmit the coded image to the user device 140. The user device 140 may receive and decode the coded image for further processing.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations (e.g., a storing operation) may be added elsewhere in the process 1200. In the storing operation, the processing device 112 may store information and/or data (e.g., the coding unit, the prediction mode, the predicted coding unit corresponding to the coding unit) associated with the image coding in a storage device (e.g., the storage device 150) disclosed elsewhere in the present disclosure. As another example, operation 1220 and operation 1230 may be combined into a single operation in which the processing device 112 may both determine the plurality of first reference lines and the plurality of second reference lines associated with the coding unit.

Figure 13:
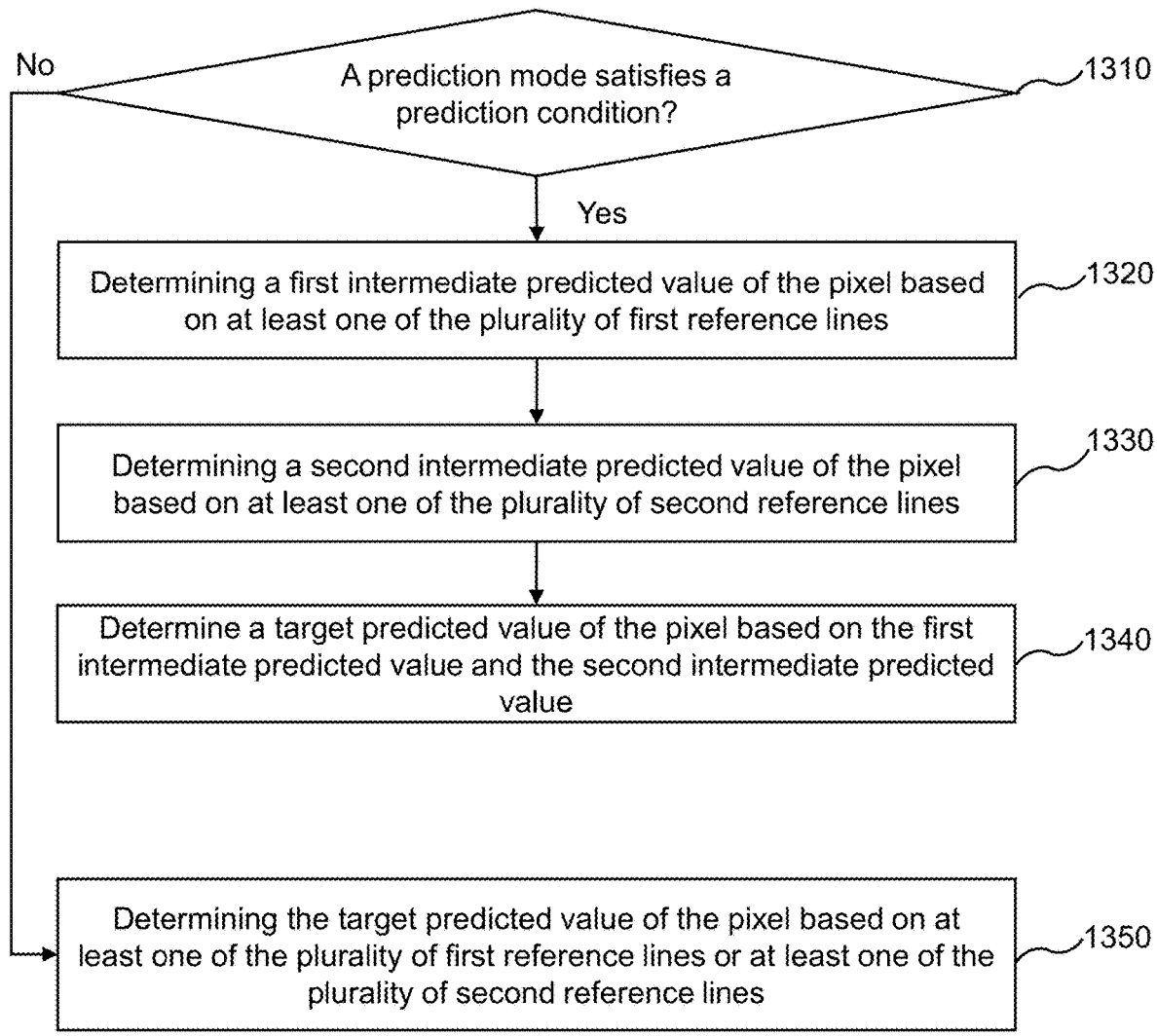
FIG. 13 is a flowchart illustrating an exemplary process for determining a target predicted value of a pixel under an angle prediction mode according to some embodiments of the present disclosure.

FIG. 13 is a flowchart illustrating an exemplary process for determining a target predicted value of a pixel under an angle prediction mode according to some embodiments of the present disclosure. In some embodiments, the process 1300 may be implemented as a set of instructions (e.g., an application) stored in the storage ROM 230 or RAM 240. The processor 220 and/or the modules in FIG. 11 may execute the set of instructions, and when executing the instructions, the processor 220 and/or the modules may be configured to perform the process 1300. The operations of the illustrated process presented below are intended to be illustrative. In some embodiments, the process 1300 may be accomplished with one or more additional operations not described and/or without one or more of the operations herein discussed. Additionally, the order in which the operations of the process as illustrated in FIG. 13 and described below is not intended to be limiting. Operation 1240 as illustrated in FIG. 12 may be performed according to process 1300 and the descriptions thereof.

In 1310, the processing device 112 (e.g., the predicted value determination module 1140) (e.g., the processing circuits of the processor 220) may determine whether a prediction mode (e.g., the angle prediction mode) satisfies a prediction condition.

In some embodiments, the prediction condition may include that an angle of the prediction mode is within an angle range (i.e., the predetermined range as described in FIG. 4 and/or FIG. 5). As described in connection with FIG. 4 and FIG. 5, the angle range may include a first range between a sequence number of an angle prediction mode in a vertical direction and a sequence number of an angle prediction mode in a first diagonal direction and/or a second range between a sequence number of an angle prediction mode in a horizontal direction and a sequence number of an angle prediction mode in a second diagonal direction.

In 1320, in response to determining that the prediction mode satisfies the prediction condition, the processing device 112 (e.g., the predicted value determination module 1140) (e.g., the processing circuits of the processor 220) may determine a first intermediate predicted value of the pixel based on at least one of the plurality of first reference lines.

In some embodiments, for each of the at least one of the plurality of first reference lines, the processing device 112 may determine a first initial predicted value of the pixel based on at least one of the plurality of first reference pixels on the first reference line. For example, the processing device 112 may determine a first projected pixel (e.g., a first reference pixel corresponding to a first projection location described in FIG. 4) on a first reference line corresponding to the pixel in the coding unit based on the prediction mode (e.g., the angle prediction mode). Further, the processing device 112 may determine a pixel value of the first projected pixel as the first initial predicted value of the pixel. As another example, the processing device 112 may determine two first reference pixels adjacent to a first projection location of the pixel on the first reference line based on the prediction mode. Further, the processing device 112 may determine the first initial predicted value corresponding to the pixel by performing an interpolation on the two first reference pixels according to formula (2) illustrated in FIG. 4.

In some embodiments, for each of at least one first initial predicted value corresponding to the at least one of the plurality of first reference lines, the processing device 112 may determine a weighting coefficient corresponding to the first initial predicted value based on a distance between the pixel and a first reference line corresponding to the first initial predicted value according to the prediction mode. As used herein, the weighting coefficient corresponding to the first initial predicted value may be negatively related to the distance between the pixel and the first reference line corresponding to the first initial predicted value. Further, the processing device 112 may determine the first intermediate predicted value of the pixel by weighting the at least one first initial predicted value based on at least one weighting coefficient corresponding to the at least one first initial predicted value according to formula (4) illustrated in FIG. 6.

In 1330, the processing device 112 (e.g., the predicted value determination module 1140) (e.g., the processing circuits of the processor 220) may determine a second intermediate predicted value of the pixel based on at least one of the plurality of second reference lines.

In some embodiments, for each of the at least one of the plurality of second reference lines, the processing device 112 may determine a second initial predicted value of the pixel based on at least one of the plurality of second reference pixels on the second reference line. For example, the processing device 112 may determine a second projected pixel (e.g., a first reference pixel corresponding to a second projection location described in FIG. 4) on a second reference line corresponding to the pixel in the coding unit based on the prediction mode (e.g., the angle prediction mode). Further, the processing device 112 may determine a pixel value of the second projected pixel as the second initial predicted value of the pixel. As another example, the processing device 112 may determine two second reference pixels adjacent to a second projection location of the pixel on the second reference line based on the prediction mode. Further, the processing device 112 may determine the second initial predicted value corresponding to the pixel by performing an interpolation on the two second reference pixels according to formula (2) illustrated in FIG. 4.

In some embodiments, for each of at least one second initial predicted value corresponding to the at least one of the plurality of second reference lines, the processing device 112 may determine a weighting coefficient corresponding to the second initial predicted value based on a distance between the pixel and a second reference line corresponding to the second initial predicted value according to the prediction mode. As used herein, the weighting coefficient corresponding to the second initial predicted value may be negatively related to the distance between the pixel and the second reference line corresponding to the second initial predicted value. Further, the processing device 112 may determine the second intermediate predicted value of the pixel by weighting the at least one second initial predicted value based on at least one weighting coefficient corresponding to the at least one second initial predicted value according to formula (5) illustrated in FIG. 6.

In 1340, the processing device 112 (e.g., the predicted value determination module 1140) (e.g., the processing circuits of the processor 220) may determine the target predicted value of the pixel based on the first intermediate predicted value and the second intermediate predicted value.

In some embodiments, the processing device 112 may determine a first weighting coefficient corresponding to the first intermediate predicted value. The first weighting coefficient may be determined based on a first global distance associated with the pixel and the at least one of the plurality of first reference lines and a second global distance associated with the pixel and the at least one of the plurality of second reference lines. In some embodiments, the first global distance may include a distance (e.g., d1) between the pixel and a projection location of the pixel in a first reference line closest to the coding unit, an average of distances between the pixel and at least one projection location of the pixel in the at least one of the plurality of first reference lines, a horizontal/vertical distance between the pixel and the first reference line closest to the coding unit, an average of horizontal/vertical distances between the pixel and the at least one of the plurality of first reference lines, a distance between the projection location of the pixel in the first reference line closest to the coding unit and the pixel to the left of the pixel. In some embodiments, the second global distance may include a distance (e.g., d1 as described in FIG. 4) between the pixel and a projection location of the pixel in a second reference line closest to the coding unit, an average of distances between the pixel and at least one projection location of the pixel in the at least one of the plurality of second reference lines, a horizontal/vertical distance between the pixel and the second reference line closest to the coding unit, an average of horizontal/vertical distances between the pixel and the at least one of the plurality of second reference lines, a distance between the projection location of the pixel in the second reference line closest to the coding unit and the pixel to the left of the pixel.

In some embodiments, the processing device 112 may determine a second weighting coefficient corresponding to the second intermediate predicted value based on the first weighting coefficient. For example, as described in connection with FIG. 4, the processing device 112 may determine the first weighting coefficient and the second weighting coefficient according to formula (3). As another example, the processing device 112 may determine the first weighting coefficient and the second weighting coefficient according to formula (7) below:

$$\left\{ \gamma 1 = \alpha * \left( deltaInt + \frac{deltaFract}{N} \right) \Big/ \left( x + 1 + deltaInt + \frac{deltaFract}{N} \right) \atop \gamma 2 = 1 - \gamma 1 \right. \quad (7)$$

where γ1 refers to the first weighting coefficient, γ2 refers to the second weighting coefficient, α refers to a weight influence factor of the first intermediate predicted value, x refers to the horizontal distance (or vertical distance) between the pixel and the second reference line closest to the coding unit, deltaInt refers to the vertical distance (or the horizontal distance) between the pixel and the first reference line closest to the coding unit, deltaFract refers to a distance between the projection location of the pixel in the first reference line closest to the coding unit and the pixel to the left of the pixel, and N refers to an interpolation accuracy. A value of N may be a positive integer power of 2, such as 8, 16, 32, 64, or the like.

In the above embodiments, the processing device 112 determines the first weighting coefficient based on the first global distance and the second global distance, which improves the accuracy of the determined first weighting coefficient and further improves the accuracy of the target predicted value of the pixel, thereby improving the effect of reducing the data redundancy of the coding unit.

Further, the processing device 112 may determine the target predicted value of the pixel by weighting the first intermediate predicted value and the second intermediate predicted value based on the first weighting coefficient and the second weighting coefficient according to formula (6) illustrated in FIG. 6.

In 1350, in response to determining that the prediction mode does not satisfy the prediction condition, the processing device 112 (e.g., the predicted value determination module 1140) (e.g., the processing circuits of the processor 220) may determine the target predicted value of the pixel based on at least one of the plurality of first reference lines or at least one of the plurality of second reference lines.

In some embodiments, the processing device 112 may determine the first intermediate predicted value of the pixel based on at least one of the plurality of first reference lines or the second intermediate predicted value of the pixel based on at least one of the plurality of second reference lines. Further, the processing device 112 may designate the first intermediate predicted value or the second intermediate predicted value as the target predicted value of the pixel.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 14:
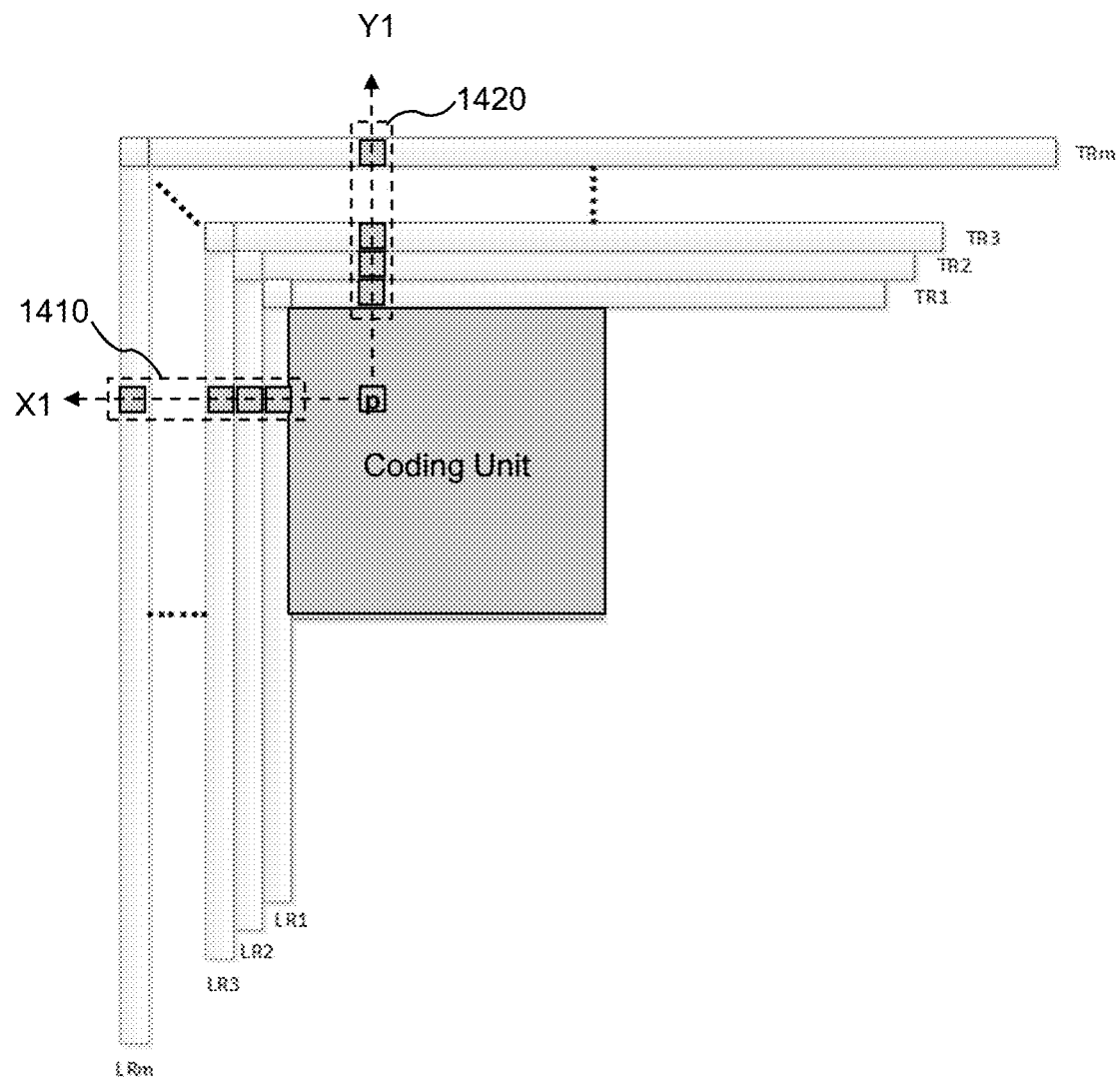
FIG. 14 is a schematic diagram illustrating exemplary operations for determining a target predicted value of a pixel under a DC prediction mode according to some embodiments of the present disclosure.

FIG. 14 is a schematic diagram illustrating exemplary operations for determining a target predicted value of a pixel under a DC prediction mode according to some embodiments of the present disclosure.

As illustrated in FIG. 14, taking a specific pixel p in a coding unit as an example, the processing device 112 may determine one or more first projected pixels 1410 corresponding to the pixel p on at least a portion of the plurality of first reference lines (e.g., LR1, LR2, LR3, . . . , LRm) in a horizontal direction denoted by arrow X1 from the pixel p to the at least a portion of the plurality of first reference lines. Further, the processing device 112 may determine a first intermediate predicted value of the pixel p by weighting pixel values of the one or more first projected pixels 1410 based on weighting coefficient corresponding to the pixel values of the one or more first projected pixels 1410 according to formula (4) illustrated in FIG. 6. For a specific first projected pixel of the one or more first projected pixels 1410, a weighting coefficient corresponding to a pixel value of the specific first projected pixel of the one or more first projected pixels 1410 may be determined based on a horizontal distance between the pixel p and a first reference line where the specific first projected pixel is located.

The processing device 112 may determine one or more second projected pixels 1420 corresponding to the pixel p on at least a portion of the plurality of second reference lines (e.g., TR1, TR2, TR3, . . . , TRm) in a vertical direction denoted by arrow Y1 from the pixel p to the at least a portion of the plurality of second reference lines. Further, the processing device 112 may determine a second intermediate predicted valueof the pixel p by weighting pixel values of the one or more second projected pixels 1420 based on weighting coefficient corresponding to the pixel values of the one or more second projected pixel 1420 according to formula (4) illustrated in FIG. 6. For a specific second projected pixel of the one or more second projected pixels 1420, a weighting coefficient corresponding to a pixel value of the specific second projected pixel of the one or more second projected pixels 1420 may be determined based on a vertical distance between the pixel p and a second reference line where the specific second projected pixel is located.

Further, the processing device 112 may determine an average of the first intermediate predicted value and the second intermediate predicted value as the target predicted value of the pixel p.

Figure 15:
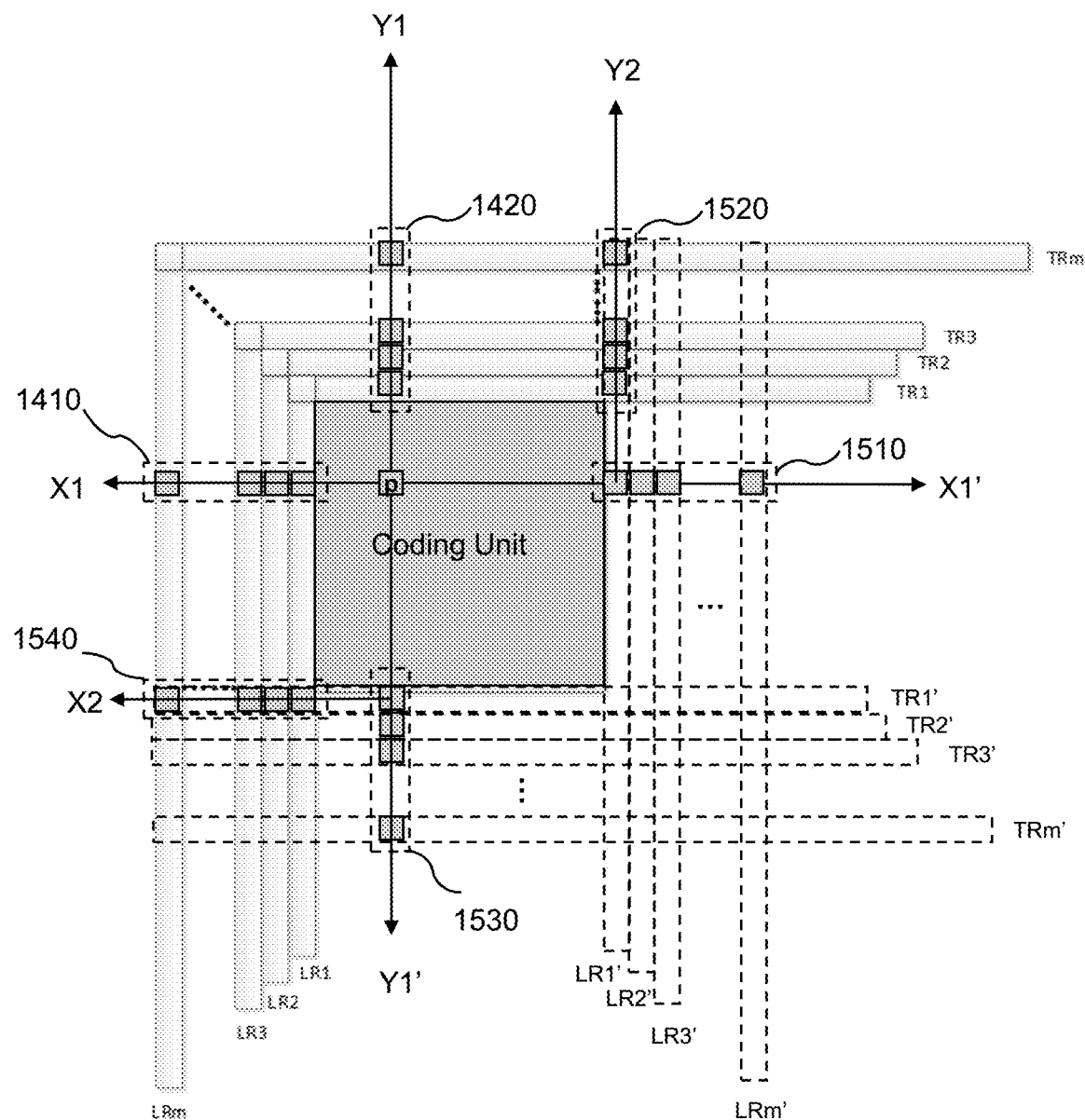
FIG. 15 is a schematic diagram illustrating exemplary operations for determining a target predicted value of a pixel under a planar prediction mode according to some embodiments of the present disclosure.

FIG. 15 is a schematic diagram illustrating exemplary operations for determining a target predicted value of a pixel under a planar prediction mode according to some embodiments of the present disclosure.

As described in connection with FIG. 14, the processing device 112 may determine the one or more first projected pixels 1410 corresponding to the pixel p on the at least a portion of the plurality of first reference lines (e.g., LR1, LR2, LR3, . . . , LRm) and further determine the first intermediate predicted value of the pixel p by weighting the pixel values of the one or more first projected pixels 1410. As illustrated in FIG. 15, it is assumed that a plurality of virtual first reference lines (e.g., LR1', LR2', LR3', . . . , LRm') are located on a right side of the coding unit. The processing device 112 may further determine one or more first projected pixels 1510 on at least a portion of the plurality of virtual first reference lines in an opposite direction denoted by arrow X1' of the horizontal direction denoted by arrow X1. In some embodiments, since there is actually no reference lines on the right side of the coding unit, the processing device 112 may determine one or more second projected pixels 1520 in a vertical direction denoted by arrow Y2 to replace the one or more first projected pixels 1510. Further, the processing device 112 may determine a first intermediate predicted value of the pixel p corresponding to the one or more first projected pixels 1510 by weighting pixel values of the one or more second projected pixels 1520 based on weighting coefficients corresponding to the pixel values of the one or more second projected pixels 1520 according to formula (4) illustrated in FIG. 6. For a specific second projected pixel of the one or more second projected pixels 1520, a weighting coefficient corresponding to a pixel value of the specific second projected pixel of the one or more second projected pixels 1520 may be determined based on a horizontal distance between the pixel p and a virtual first reference line where the specific second predicted pixel locates.

As described in connection with FIG. 14, the processing device 112 may determine the one or more second projected pixels 1420 corresponding to the pixel p on the at least a portion of the plurality of second reference lines (e.g., TR1, TR2, TR3, . . . , TRm) and further determine the second intermediate predicted value of the pixel p by weighting the pixel values of the one or more second projected pixels 1420. As illustrated in FIG. 15, it is assumed that a plurality of virtual second reference lines (e.g., TR1', TR2', TR3', . . . , TRm') are located on a lower side of the coding unit. The processing device 112 may determine one or more second projected pixels 1530 on at least a portion of the plurality of virtual second reference lines in an opposite direction denoted by arrow Y1' of the vertical direction denoted by arrow Y1. In some embodiments, since there is actually no reference lines on the lower side of the coding unit, the processing device 112 may determine one or more first projected pixels 1540 in a horizontal direction denoted by arrow X2 to replace the one or more second projected pixels 1530. Further, the processing device 112 may determine a second intermediate predicted value of the pixel p corresponding to the one or more second projected pixels 1530 by weighting pixel values of the one or more first projected pixels 1540 based on weighting coefficients corresponding to the pixel values of the one or more first projected pixels 1540 according to formula (4) illustrated in FIG. 6. For a specific first projected pixel of the one or more first projected pixels 1540, a weighting coefficient corresponding to a pixel value of the specific first projected pixel of the one or more first projected pixels 1540 may be determined based on a vertical distance between the pixel p and a virtual second reference line where the specific first predicted pixel locates.

Further, the processing device 112 may determine an average of the first intermediate predicted value corresponding to the one or more first projected pixels 1410, the first intermediate predicted value corresponding to the one or more first projected pixels 1510, the second intermediate predicted value corresponding to the one or more second projected pixels 1420, and the second intermediate predicted value corresponding to the one or more second projected pixels 1530 as the target predicted value of the pixel p.

Figure 16:
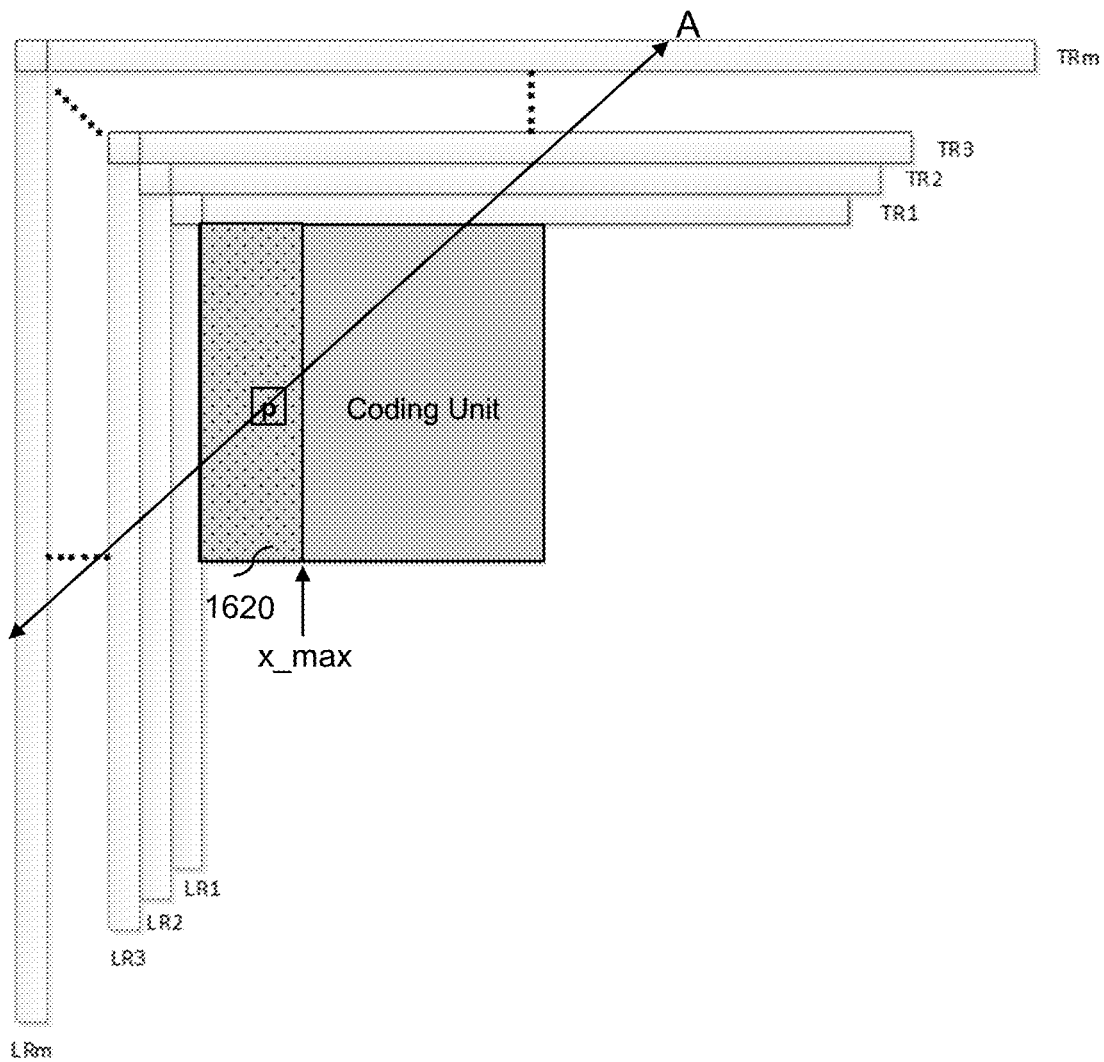
FIG. 16 is a schematic diagram illustrating an exemplary compensation operation under an angle prediction mode according to some embodiments of the present disclosure.

FIG. 16 is a schematic diagram illustrating an exemplary compensation operation under an angle prediction mode according to some embodiments of the present disclosure. As described in connection with FIG. 12, the processing device 112 may determine a compensation region (e.g., 1620) based on the prediction mode and a size of the coding unit. As illustrated in FIG. 16, taking a specific angle prediction mode as an example, it is assumed that a direction of the specific angle prediction mode points to an upper side of a coding unit denoted by arrow A, the processing device 112 may determine the compensation region along a left side of the coding unit. A boundary of the compensation region may be determined according to formula (8) below:

$$\begin{cases} \text{scale} = ((\log_2[\text{width}] - 2 + \log_2[\text{height}] - 2 + 2) \gg 2) \\ \text{x\_max} = (6 \ll \text{scale}) \gg 1 \end{cases} \quad (8)$$

where x_max refers to the boundary of the compensation region, width refers to a width of the coding unit, height refers to a height of the coding unit, and scale refers to an intermediate value of x_max.

Further, taking a specific pixel p in the compensation region as an example, as described in connection with FIG. 12, the processing device 112 may determine a target predicted value of the pixel p by performing a compensation operation on the preliminary predicted value (e.g., the first intermediate predicted value) of the pixel p according to the compensation value (e.g., the second intermediate predicted value) of the pixel p. In some embodiments, the processing device 112 may perform the compensation operation based on a weighting coefficient corresponding to the compensation value to determine the target predicted value of the pixel p according to formula (8) below:

$$\text{pDst}[x] = (wL * c(x) + (64 - wL) * p[x] + 32) \gg 6 \quad (8)$$

where pDst[x] refers to the target predicted value of the pixel p, c(x) refers to the compensation value of the pixel p, p[x] refers to the preliminary predicted value of the pixel p, wL refers to the weighting coefficient corresponding to the compensation value, and (64−wL) refers to a weighting coefficient corresponding to the preliminary predicted value.

In some embodiments, the processing device 112 may determine the weighting coefficient corresponding to the compensation value based on a horizontal distance between the pixel p and the left side of the coding unit according to formula (9) below:

$$\begin{cases} \text{if } x \leq \text{x\_max} \\ wL = 32 \gg \min(31, ((x \ll 1) \gg \text{scale})) \end{cases} \quad (9)$$

where wL refers to the weighting coefficient corresponding to the compensation value, x refers to the horizontal distance between the pixel p and the left side of the coding unit.

In the above embodiments, the processing device 112 may determine the weighting coefficient corresponding to the compensation value based on the distance between the pixel and tone single boundary (e.g., left boundary) of the coding unit, which reduces the accuracy of the determined weighting coefficient.

In some embodiments, the present disclosure may also provide an encoder including a processor (e.g., the processing device 112). The processor may be configured to execute instructions to implement a process (e.g., process 400, process 600, process 900, process 1000, process 1200, process 1300) described elsewhere in the present disclosure. As used herein, the encoder may further include a storage (not shown) storing instructions and data and the instructions and data may be executed by the processor.

In some embodiments, the present disclosure may also provide a storage storing instructions. The instructions may be executed to implement a process (e.g., process 400, process 600, process 900, process 1000, process 1200, process 1300) described elsewhere in the present disclosure. In some embodiments, the instructions may be formed a program file and stored in the storage in a form of a software product, so that a computer device (e.g., a personal computer, a server, a network device, etc.) or a processor may execute the process described elsewhere in the present disclosure. In some embodiments, the storage may include but not limited to a U disk, a mobile hard disk, a read-only memory (ROM), a random access memory (RAM), a disk, an optical disk, a terminal device (e.g., a computer, a server, a mobile phone, a tablet, etc.), or the like, or any combination thereof.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or comlocation of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A system, comprising:
at least one storage medium including a set of instructions; and
at least one processor in communication with the at least one storage medium, wherein when executing the set of instructions, the at least one processor is directed to cause the system to:
determine a coding unit in an image, the coding unit including a plurality of pixels;
determine multiple first reference lines associated with the coding unit, each of the multiple first reference lines being along a first side of the coding unit and including a plurality of first reference pixels;
determine multiple second reference lines associated with the coding unit, each of the multiple second reference lines being along a second side of the coding unit and including a plurality of second reference pixels, wherein a first count of the plurality of first reference pixels in each first reference line and a second count of the plurality of second reference pixels in each second reference line are determined according to formula below:

$$\begin{cases} whRatio = \max(1, \text{width/height}) \\ hwRatio = \max(1, \text{height/width}) \\ Mln = Ml + (hwRatio + 1)*(n-1) \\ Mtn = Mt + (whRatio + 1)*(n-1) \end{cases},$$

where width refers to a width of the coding unit, and height refers to a height of the coding unit, Mln refers to the first count of first reference pixels on a nth first reference line, and Mtn refers to the second count of second reference pixels on a nth second reference line;
for each of the plurality of pixels in the coding unit,
determine whether a prediction mode that used to predict the pixel satisfies a prediction condition, the prediction condition including that a sequence number of the prediction mode is within a predetermined range, wherein the predetermined range includes a first range and/or a second range, the first range is between a sequence number of a prediction mode in a vertical direction and a sequence number of a prediction mode in a first diagonal direction, the second range is between a sequence number of a prediction mode in a horizontal direction and a sequence number of a prediction mode in a second diagonal direction, an angle between the first diagonal direction and the vertical direction is 45 degrees, an angle between the second diagonal direction and the horizontal direction is 45 degrees, and both the first diagonal direction and the second diagonal direction are not between the vertical direction and the horizontal direction; and
in response to determining that the prediction mode satisfies the prediction condition, determine a target predicted value of the pixel based on the multiple first reference lines and the multiple second reference lines according to the prediction mode;

in response to determining that the prediction mode does not satisfy the prediction condition, determine the target predicted value of the pixel based on the multiple first reference lines or the multiple second reference lines; and determine a predicted coding unit corresponding to the coding unit based on a plurality of target predicted values of the plurality of pixels in the coding unit.

2. The system of claim 1, wherein in response to determining that the prediction mode satisfies the prediction condition, to determine the target predicted value of the pixel based on the multiple first reference lines and the multiple second reference lines, the at least one processor is directed to cause the system further to:

determine a first intermediate predicted value of the pixel based on the multiple first reference lines;

determine a second intermediate predicted value of the pixel based on the multiple second reference lines; and determine the target predicted value of the pixel based on the first intermediate predicted value and the second intermediate predicted value.

3. The system of claim 2, wherein to determine the first intermediate predicted value of the pixel based on the multiple first reference lines, the at least one processor is directed to cause the system further to:

for each of the multiple first reference lines, determine a first initial predicted value corresponding to the pixel based on at least one of the plurality of first reference pixels on the first reference line; and determine the first intermediate predicted value of the pixel based on multiple first initial predicted values corresponding to the multiple first reference lines.

4. The system of claim 3, wherein for each of the multiple first reference lines, to determine the first initial predicted value corresponding to the pixel based on the at least one of the plurality of first reference pixels on the first reference line, the at least one processor is directed to cause the system further to:

determine a first projected pixel corresponding to the pixel on the first reference line based on the prediction mode; and determine a value of the first projected pixel as the first initial predicted value corresponding to the pixel.

5. The system of claim 3, wherein for each of the multiple first reference lines, to determine the first initial predicted value corresponding to the pixel based on the at least one of the plurality of first reference pixels on the first reference line, the at least one processor is directed to cause the system further to:

determine two first reference pixels corresponding to the pixel on the first reference line based on the prediction mode; and determine the first initial predicted value corresponding to the pixel by performing an interpolation on the two first reference pixels.

6. The system of claim 3, wherein to determine the first intermediate predicted value of the pixel based on the multiple first initial predicted values corresponding to the multiple first reference lines, the at least one processor is directed to cause the system further to:

for each of multiple first initial predicted values, determine a weighting coefficient corresponding to the first initial predicted value based on a distance between the pixel and a first reference line corresponding to the first initial predicted value according to the prediction mode; and determine the first intermediate predicted value of the pixel by weighting the multiple first initial predicted values based on multiple weighting coefficients corresponding to the multiple first initial predicted values.

7. The system of claim 2, wherein to determine the second intermediate predicted value of the pixel based on the multiple second reference lines, the at least one processor is directed to cause the system further to:

for each of the multiple second reference lines, determine a second initial predicted value corresponding to the pixel based on at least one of the plurality of second reference pixels on the second reference line; and determine the second intermediate predicted value of the pixel based on multiple second initial predicted values corresponding to the multiple second reference lines.

8. The system of claim 7, wherein for each of the multiple second reference lines, to determine the second initial predicted value corresponding to the pixel based on the at least one of the plurality of second reference pixels on the second reference line, the at least one processor is directed to cause the system further to:

determine a second projected pixel corresponding to the pixel on the second reference line based on the prediction mode; and determine a value of the second projected pixel as the second initial predicted value corresponding to the pixel.

9. The system of claim 7, wherein for each of the multiple second reference lines, to determine the second initial predicted value corresponding to the pixel based on the at least one of the plurality of second reference pixels on the second reference line, the at least one processor is directed to cause the system further to:

determine two second reference pixels corresponding to the pixel on the second reference line based on the prediction mode; and determine the second initial predicted value corresponding to the pixel by performing an interpolation on the two second reference pixels.

10. The system of claim 7, wherein to determine the second intermediate predicted value of the pixel based on the multiple second initial predicted values corresponding to the multiple second reference lines, the at least one processor is directed to cause the system further to:

for each of the multiple second initial predicted values, determine a weighting coefficient corresponding to the second initial predicted value based on a distance between the pixel and a second reference line corresponding to the second initial predicted value according to the prediction mode; and determine the second intermediate predicted value of the pixel by weighting the multiple second initial predicted values based on multiple weighting coefficients corresponding to the multiple second initial predicted values.

11. The system of claim 2, wherein to determine the target predicted value of the pixel based on the first intermediate predicted value and the second intermediate predicted value, the at least one processor is directed to cause the system further to:

determine a first weighting coefficient corresponding to the first intermediate predicted value, wherein the first weighting coefficient is associated with a first global distance between the pixel and the multiple first reference lines and a second global distance between the pixel and the multiple second reference lines;

determine a second weighting coefficient corresponding to the second intermediate predicted value based on the first weighting coefficient; and determine the target predicted value of the pixel by weighting the first intermediate predicted value and the second intermediate predicted value based on the first weighting coefficient and the second weighting coefficient.

12. The system of claim 1, wherein the at least one processor is directed to cause the system further to:
determine whether a size of the coding unit is higher than a predetermined size; and
in response to determining that size of the coding unit is higher than the predetermined size, perform a filtering operation on the plurality of first reference pixels of each first reference line and the plurality of second reference pixels of each second reference line.

13. The system of claim 1, wherein the at least one processor is directed to cause the system further to:
determine whether the prediction mode satisfies a filtering condition; and
in response to determining that the prediction mode satisfies the filtering condition, perform a filtering operation on the plurality of first reference pixels of each first reference line and the plurality of second reference pixels of each second reference line.

14. The system of claim 1, wherein the prediction mode includes at least one of a DC prediction mode, a planar prediction mode, or an angle prediction mode.

15. A method implemented on a computing device including at least one processor, at least one storage medium, and a communication platform connected to a network, the method comprising:
determining a coding unit in an image, the coding unit including a plurality of pixels;
determining multiple first reference lines associated with the coding unit, each of the multiple first reference lines being along a first side of the coding unit and including a plurality of first reference pixels;
determining multiple second reference lines associated with the coding unit, each of the multiple second reference lines being along a second side of the coding unit and including a plurality of second reference pixels, wherein a first count of the plurality of first reference pixels in each first reference line and a second count of the plurality of second reference pixels in each second reference line are determined according to formula below:

$$\begin{cases} whRatio = \max(1, width/height) \\ hwRatio = \max(1, height/width) \\ Mln = Ml + (hwRatio + 1)*(n-1) \\ Mtn = Mt + (whRatio + 1)*(n-1) \end{cases},$$

where width refers to a width of the coding unit, and height refers to a height of the coding unit, Mln refers to the first count of first reference pixels on a nth first reference line, and Mtn refers to the second count of second reference pixels on a nth second reference line;
for each of the plurality of pixels in the coding unit,
determining whether a prediction mode that used to predict the pixel satisfies a prediction condition, the prediction condition including that a sequence number of the prediction mode is within a predetermined range, wherein the predetermined range includes a first range and/or a second range, the first range is between a sequence number of a prediction mode in a vertical direction and a sequence number of a prediction mode in a first diagonal direction, the second range is between a sequence number of a prediction mode in a horizontal direction and a sequence number of a prediction mode in a second diagonal direction, an angle between the first diagonal direction and the vertical direction is 45 degrees, an angle between the second diagonal direction and the horizontal direction is 45 degrees, and both the first diagonal direction and the second diagonal direction are not between the vertical direction and the horizontal direction; and
in response to determining that the prediction mode satisfies the prediction condition, determining a target predicted value of the pixel based on the multiple first reference lines and the multiple second reference lines according to the prediction mode;
in response to determining that the prediction mode does not satisfy the prediction condition, determining the target predicted value of the pixel based on the multiple first reference lines or the multiple second reference lines; and
determining a predicted coding unit corresponding to the coding unit based on a plurality of target predicted values of the plurality of pixels in the coding unit.

16. A non-transitory computer readable medium, comprising executable instructions that, when executed by at least one processor, direct the at least one processor to perform a method, the method comprising:
determining a coding unit in an image, the coding unit including a plurality of pixels;
determining multiple first reference lines associated with the coding unit, each of the multiple first reference lines being along a first side of the coding unit and including a plurality of first reference pixels;
determining multiple second reference lines associated with the coding unit, each of the multiple second reference lines being along a second side of the coding unit and including a plurality of second reference pixels, wherein a first count of the plurality of first reference pixels in each first reference line and a second count of the plurality of second reference pixels in each second reference line are determined according to formula below:

$$\begin{cases} whRatio = \max(1, width/height) \\ hwRatio = \max(1, height/width) \\ Mln = Ml + (hwRatio + 1)*(n-1) \\ Mtn = Mt + (whRatio + 1)*(n-1) \end{cases},$$

where width refers to a width of the coding unit, and height refers to a height of the coding unit, Mln refers to the first count of first reference pixels on a nth first reference line, and Mtn refers to the second count of second reference pixels on a nth second reference line;
for each of the plurality of pixels in the coding unit,
determining whether a prediction mode that used to predict the pixel satisfies a prediction condition, the prediction condition including that a sequence number of the prediction mode is within a predetermined range, wherein the predetermined range includes a first range and/or a second range, the first range is between a sequence number of a prediction mode in a vertical direction and a sequence number of a prediction mode in a first diagonal direction, the second range is between a sequence number of a prediction mode in a horizontal direction and a sequence number of a prediction mode in a second diagonal direction, an angle between the first diagonal direction and the vertical direction is 45 degrees, an angle between the second diagonal direction and the horizontal direction is 45 degrees, and both the first diagonal direction and the second diagonal direction are not between the vertical direction and the horizontal direction; and in response to determining that the prediction mode satisfies the prediction condition, determining a target predicted value of the pixel based on the multiple first reference lines and the multiple second reference lines according to the prediction mode;

in response to determining that the prediction mode does not satisfy the prediction condition, determining the target predicted value of the pixel based on the multiple first reference lines or the multiple second reference lines; and determining a predicted coding unit corresponding to the coding unit based on a plurality of target predicted values of the plurality of pixels in the coding unit.

17. The system of claim 2, wherein to determine the target predicted value of the pixel based on the first intermediate predicted value and the second intermediate predicted value, the at least one processor is directed to cause the system further to:

determine the target predicted value of the pixel by performing a weighted averaging operation on the first intermediate predicted value and the second intermediate predicted value, wherein in the weighted averaging operation, a weighting coefficient of the first intermediate predicted value is negatively related to a first distance between the pixel and a location corresponding to a first projected pixel, the first projected pixel being determined by projecting the pixel on a first reference line based on the prediction mode, and a weighting coefficient of the second intermediate value is negatively related to a second distance between the pixel and a location corresponding to a second projected pixel, the second projected pixel being determined by projecting the pixel on a second reference line based on the prediction mode.

18. The system of claim 1, wherein the prediction condition further include that the pixel is within a compensation region, wherein a size of the compensation region is not larger than a size of the coding unit and each of pixels in the compensation region has a second projection location, the second projection location of the pixel being obtained by projecting the pixel onto the multiple first reference lines or the multiple second reference lines along an opposite direction of the prediction mode.

* * * * *